(12) United States Patent
Wei et al.

(10) Patent No.: US 12,114,326 B2
(45) Date of Patent: Oct. 8, 2024

(54) CONTROL RESOURCE SET DESIGN FOR BANDWIDTH REDUCED LOW-TIER USER EQUIPMENT

(71) Applicant: Qualcomm Incorporated, San Diego, CA (US)

(72) Inventors: Chao Wei, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/630,179

(22) PCT Filed: Jul. 31, 2020

(86) PCT No.: PCT/CN2020/106105
§ 371 (c)(1),
(2) Date: Jan. 26, 2022

(87) PCT Pub. No.: WO2021/018277
PCT Pub. Date: Feb. 4, 2021

(65) Prior Publication Data
US 2022/0279563 A1    Sep. 1, 2022

(30) Foreign Application Priority Data
Jul. 31, 2019   (WO) ................ PCT/CN2019/098568

(51) Int. Cl.
*H04W 72/23* (2023.01)
*H04L 1/00* (2006.01)

(52) U.S. Cl.
CPC ........... *H04W 72/23* (2023.01); *H04L 1/0071* (2013.01)

(58) Field of Classification Search
CPC ..... H04L 1/0071; H04L 1/0072; H04L 5/001; H04L 5/0026; H04L 5/14; H04L 5/0053; H04L 5/0082; H04L 5/0094; H04W 72/23
See application file for complete search history.

(56) References Cited

U.S. PATENT DOCUMENTS

2017/0181169 A1    6/2017 Choi
2018/0359755 A1*  12/2018 Sun ....................... H04L 5/0053
(Continued)

FOREIGN PATENT DOCUMENTS

| CN | 108347325 A | 7/2018 |
| CN | 109428701 A | 3/2019 |
| WO | WO-2018231490 A1 | 12/2018 |

OTHER PUBLICATIONS

Huawei, et al., "Discussion on Rate Matching in URLLC Due to the Ambiguity Between PDCCH AL8 and AL16", 3GPP TSG RAN WG1 Meeting #97, R1-1906614, May 17, 2019 (May 17, 2019), 5 pages, the whole document.
(Continued)

*Primary Examiner* — Khoa Huynh
(74) *Attorney, Agent, or Firm* — Holland & Hart LLP

(57) ABSTRACT

Methods, systems, and devices for wireless communications are described. A bandwidth reduced low-tier user equipment (UE) may receive a signal identifying a control resource set for the UE to monitor for control information scheduling communications between the UE and a base station, the control resource set comprising a plurality of control channel elements organized across more than three symbols and comprising one or more first resource element groups mapped to a first monitoring occasion and one or more second resource element groups mapped to a second monitoring occasion. The UE may receive, during the first monitoring occasion, at least a first portion of the control information on the one or more first resource element
(Continued)

groups. The UE may receive, during the second monitoring occasion, at least a second portion of the control information on the one or more second resource element groups. The UE may communicate with the base station in accordance with the control information.

30 Claims, 21 Drawing Sheets

(56) References Cited

U.S. PATENT DOCUMENTS

| 2018/0368116 A1* | 12/2018 | Liao | H04W 76/27 |
| 2019/0149365 A1* | 5/2019 | Chatterjee | H04L 25/0226 |
| | | | 370/329 |

OTHER PUBLICATIONS

International Search Report and Written Opinion—PCT/CN2020/106105—ISA/EPO—Sep. 29, 2020.
International Search Report and Written Opinion—PCT/CN2019/098568—ISA/EPO—Apr. 20, 2020.
Zte, et al., "NR DL Control Channel Structure," R1-1701585, 3GPP TSG RAN WG1 Meeting #88, Feb. 13-17, 2017, Feb. 7, 2017 (Feb. 7, 2017), 8 pages, the whole document.
CATT: "Summary of Offline Discussion on Remaining Minimum System Information", 3GPP TSG RAN WG1 Meeting 91, R1-1721605 (Revision of R1-1721554) Summary for RMSI issues Nov 30A, 3GPP, Mobile Competence Centre, 650, Route Des Lucioles, F-06921 Sophia-Antipolis Cedex, France, vol. RAN WG1, No. Reno, USA, Nov. 27, 2017-Dec. 1, 2017, 27 Pages, Dec. 1, 2017, XP051370642, figures 1, 2, sections 1, 2, table 2.4.2 Summary, p. 11.
Supplementary European Search Report—EP20847173—Search Authority—The Hague—Jul. 26, 2023.

* cited by examiner

CONTROL RESOURCE SET DESIGN FOR BANDWIDTH REDUCED LOW-TIER USER EQUIPMENT

CROSS-REFERENCE TO RELATED APPLICATIONS

The present Application is a 371 national stage filing of International PCT Application No. PCT/CN2020/106105 by WEI et al., entitled "CONTROL RESOURCE SET DESIGN FOR BANDWIDTH REDUCED LOW-TIER USER EQUIPMENT," filed Jul. 31, 2020; and claims priority to International PCT Application No. PCT/CN2019/098568 by WEI et al., entitled "CONTROL RESOURCE SET DESIGN FOR BANDWIDTH REDUCED LOW-TIER USER EQUIPMENT," filed Jul. 31, 2019, each of which is assigned to the assignee hereof, and each of which is expressly incorporated by reference in its entirety herein.

BACKGROUND

The following relates generally to wireless communications, and more specifically to control resource set design for bandwidth reduced low-tier user equipment (UE).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

SUMMARY

The described techniques relate to improved methods, systems, devices, and apparatuses that support control resource set design for bandwidth reduced low-tier user equipment (UE). Generally, the described techniques provide mechanisms to support control resource configurations that are supported by a bandwidth limited UE by spreading at least a portion of the control information across more than three symbols and across multiple slots. For example, a base station may configure or otherwise map control channel elements (CCEs) across more than three symbols. Each of the CCEs may include resource element groups (REGs) (e.g., a one or more first REGs or REG subgroups and one or more second REGs or REG subgroups). Some of the REGs may be mapped to a first monitoring occasion (e.g., a first set of time resources in a first slot) and others may be mapped to a second monitoring occasion (e.g., in a same or different slot as the first monitoring occasion). The base station may transmit or otherwise convey a signal to a UE identifying the control resource set for the UE to monitor for control information scheduling communications with the base station. The base station may then transmit at least a portion (e.g., a first portion) of the control information on the REGs in the first monitoring occasion and then transmit another portion (e.g., a second portion) of the control information on the REGs in the second monitoring occasion. The control information may be spread over more than two monitoring occasions. Accordingly, the UE and base station may perform wireless communications (e.g., uplink and/or downlink communications) based on the control information received in the REGs in the first and second monitoring occasions, respectively.

In another example, all of the control information may be communicated in more than three symbols of a single slot. For example, the base station may map the CCEs across more than three symbols and transmit a signal to the UE identifying or otherwise configuring the UE with the control resource set for communications. The base station may transmit the control information during the slot and over the more than three symbols, which the UE and base station may then use to perform wireless communications.

A method of wireless communication at a UE is described. The method may include receiving a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receiving, during the first monitoring occasion, at least a first portion of the control information on the one or more first REGs, receiving, during the second monitoring occasion, at least a second portion of the control information on the one or more second REGs, and communicating with the base station in accordance with the control information.

An apparatus for wireless communication at a UE is described. The apparatus may include a processor, memory coupled with the processor, and instructions stored in the memory. The instructions may be executable by the processor to cause the apparatus to receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receive, during the first monitoring occasion, at least a first portion of the control information on the one or more first REGs, receive, during the second monitoring occasion, at least a second portion of the control information on the one or more second REGs, and communicate with the base station in accordance with the control information.

Another apparatus for wireless communication at a UE is described. The apparatus may include means for receiving a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receiving, during the first monitoring occasion, at least a first portion of the control information on the one or more first REGs, receiving, during the second monitoring occasion, at least a second portion of the control information on the one or more second REGs, and communicating with the base station in accordance with the control information.

A non-transitory computer-readable medium storing code for wireless communication at a UE is described. The code may include instructions executable by a processor to receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receive, during the first monitoring occasion, at least a first portion of the control information on the one or more first REGs, receive, during the second monitoring occasion, at least a second portion of the control information on the one or more second REGs, and communicate with the base station in accordance with the control information.

In some examples of the method, apparatuses, and non-transitory computer-readable medium described herein, the one or more first REGs comprise a first CCE and the one or more second REGs comprise a second CCE, wherein the first CCE is different from the second CCE.

In some examples of the method, apparatuses, and non-transitory computer-readable medium described herein, receiving at least the first portion of the control information on the one or more first REGs during the first monitoring occasion may include operations, features, means, or instructions for identifying the one or more first REGs based on a corresponding REG index that may be based on an increasing order of symbol indices of the first monitoring occasion.

In some examples of the method, apparatuses, and non-transitory computer-readable medium described herein, receiving at least the first portion of the control information on the one or more first REGs during the first monitoring occasion further may include operations, features, means, or instructions for identifying the one or more first REGs based on the corresponding REG index that may be further based on an increasing order of frequency resource block resource indices within the first monitoring occasion.

In some examples of the method, apparatuses, and non-transitory computer-readable medium described herein, receiving at least the first portion of the control information on the one or more first REGs during the first monitoring occasion further may include operations, features, means, or instructions for identifying the one or more first REGs based on the corresponding REG index that may be further based on an increasing order of indices of the first monitoring occasion and the second monitoring occasion.

In some examples of the method, apparatuses, and non-transitory computer-readable medium described herein, receiving at least the first portion of the control information on the one or more first REGs during the first monitoring occasion further may include operations, features, means, or instructions for identifying the one or more first REGs based on an interleaver pattern that may be further based on the one or more first REGs of the first monitoring occasion.

Some examples of the method, apparatuses, and non-transitory computer-readable medium described herein may further include operations, features, means, or instructions for deinterleaving the one or more first REGs of the first monitoring occasion separately from the second one or more REGs of the second monitoring occasion.

In some examples of the method, apparatuses, and non-transitory computer-readable medium described herein, deinterleaving the one or more first REGs of the first monitoring occasion and the one or more second REGs of the second monitoring occasion may include operations, features, means, or instructions for identifying a cyclic shift applied to the interleaved one or more first REGs of the first monitoring occasion and one or more second REGs of the second monitoring occasion, where the cyclic shift may be based on at least one of a first identifier for the one or more first REGs, or a second identifier for the one or more second REGs, or a slot index for the first monitoring occasion, or a second index for the second monitoring occasion, or a combination thereof.

Some examples of the method, apparatuses, and non-transitory computer-readable medium described herein may further include operations, features, means, or instructions for identifying a slot index for the first monitoring occasion, and identifying the first CCE index of the set of CCEs in the control resource set based on the slot index.

In some examples of the method, apparatuses, and non-transitory computer-readable medium described herein, the first portion of the control information may be received over two or more control portions of the first monitoring occasion, and the second portion of the control information may be received over two or more control portions of the second monitoring occasion.

In some examples of the method, apparatuses, and non-transitory computer-readable medium described herein, the first monitoring occasion is a same or a different slot than the second monitoring occasion.

In some examples of the method, apparatuses, and non-transitory computer-readable medium described herein, the first monitoring occasion is in a different slot than the second monitoring occasion. Some examples of the method, apparatuses, and non-transitory computer-readable medium described herein may further include operations, features, means, or instructions for identifying a timing for the communications with the base station based on a slot index of the first monitoring occasion and an indication of the control information.

A method of wireless communication at a base station is described. The method may include mapping a set of CCEs across more than three symbols, with the set of CCEs including one or more first REGs mapped to a first monitoring occasion and one or more second REGs mapped to a second monitoring occasion, transmitting a signal identifying a control resource set for a UE to monitor for control information scheduling communications between the UE and the base station, the control resource set including the set of CCEs, transmitting, during the first monitoring occasion, at least a first portion of the control information on the one or more first REGs, transmitting, during the second monitoring occasion, at least a second portion of the control information on the one or more second REGs, and communicating with the UE in accordance with the control information.

An apparatus for wireless communication at a base station is described. The apparatus may include a processor, memory coupled with the processor, and instructions stored in the memory. The instructions may be executable by the processor to cause the apparatus to map a set of CCEs across more than three symbols, with the set of CCEs including one or more first REGs mapped to a first monitoring occasion and one or more second REGs mapped to a second monitoring occasion, transmit a signal identifying a control resource set for a UE to monitor for control information scheduling communications between the UE and the base station, the control resource set including the set of CCEs, transmit, during the first monitoring occasion, at least a first portion of the control information on the one or more first REGs, transmit, during the second monitoring occasion, at least a second portion of the control information on the one or more second REGs, and communicate with the UE in accordance with the control information.

Another apparatus for wireless communication at a base station is described. The apparatus may include means for mapping a set of CCEs across more than three symbols, with the set of CCEs including one or more first REGs mapped to a first monitoring occasion and one or more second REGs mapped to a second monitoring occasion, transmitting a signal identifying a control resource set for a UE to monitor for control information scheduling communications between the UE and the base station, the control resource set including the set of CCEs, transmitting, during the first monitoring occasion, at least a first portion of the control information on the one or more first REGs, transmitting, during the second monitoring occasion, at least a second portion of the control information on the one or more second REGs, and communicating with the UE in accordance with the control information.

A non-transitory computer-readable medium storing code for wireless communication at a base station is described. The code may include instructions executable by a processor to map a set of CCEs across more than three symbols, with the set of CCEs including one or more first REGs mapped to a first monitoring occasion and one or more second REGs mapped to a second monitoring occasion, transmit a signal identifying a control resource set for a UE to monitor for control information scheduling communications between the UE and the base station, the control resource set including the set of CCEs, transmit, during the first monitoring occasion, at least a first portion of the control information on the one or more first REGs, transmit, during the second monitoring occasion, at least a second portion of the control information on the one or more second REGs, and communicate with the UE in accordance with the control information.

Some examples of the method, apparatuses, and non-transitory computer-readable medium described herein may further include operations, features, means, or instructions for transmitting the first portion of the control information over two or more control portions of the first monitoring occasion, and transmitting the second portion of the control information over two or more control portions of the second monitoring occasion.

In some examples of the method, apparatuses, and non-transitory computer-readable medium described herein, transmitting at least the first portion of the control information on the one or more first REGs during the first monitoring occasion may include operations, features, means, or instructions for mapping the one or more first REGs with a corresponding REG index that may be further based on an increasing order of symbol indices of the first monitoring occasion.

In some examples of the method, apparatuses, and non-transitory computer-readable medium described herein, transmitting at least the first portion of the control information on the one or more first REGs during the first monitoring occasion may include operations, features, means, or instructions for mapping the one or more first REGs with a corresponding REG index that may be further based on an increasing order of frequency resource block resource indices within the first monitoring occasion.

In some examples of the method, apparatuses, and non-transitory computer-readable medium described herein, transmitting at least the first portion of the control information on the one or more first REGs during the first monitoring occasion may include operations, features, means, or instructions for mapping the one or more first REGs with a corresponding REG index that may be further based on an increasing order of indices of the first monitoring occasion and the second monitoring occasion.

In some examples of the method, apparatuses, and non-transitory computer-readable medium described herein, transmitting at least the first portion of the control information on the one or more first REGs during the first monitoring occasion further may include operations, features, means, or instructions for mapping the one or more first REGs with a corresponding interleaver pattern that may be further based on the one or more first REGs within the first monitoring occasion.

Some examples of the method, apparatuses, and non-transitory computer-readable medium described herein may further include operations, features, means, or instructions for interleaving the one or more first REGs of the first monitoring occasion separately from the one or more second REGs of the second monitoring occasion.

In some examples of the method, apparatuses, and non-transitory computer-readable medium described herein, interleaving the one or more first REGs of the first monitoring occasion and the one or more second REGs of the second monitoring occasion may include operations, features, means, or instructions for applying a cyclic shift to the interleaved one or more first REGs of the first monitoring occasion and one or more second REGs of the second monitoring occasion, where the cyclic shift may be based on at least one of a first identifier for the one or more first REGs, or a second identifier for the one or more second REGs, or a slot index for the first monitoring occasion, or a second index for the second monitoring occasion, or a combination thereof.

Some examples of the method, apparatuses, and non-transitory computer-readable medium described herein may further include operations, features, means, or instructions for selecting a slot index for the first monitoring occasion, and identifying the first CCE index of the set of CCEs in the control resource set based on the slot index.

In some examples of the method, apparatuses, and non-transitory computer-readable medium described herein, the one or more first REGs comprise a first CCE and the one or more second REGs comprise a second CCE, wherein the first CCE is different from the second CCE.

In some examples of the method, apparatuses, and non-transitory computer-readable medium described herein, the first monitoring occasion is a same or a different slot than the second monitoring occasion.

In some examples of the method, apparatuses, and non-transitory computer-readable medium described herein, the first monitoring occasion is in a different slot than the second monitoring occasion. Some examples of the method, apparatuses, and non-transitory computer-readable medium described herein may further include operations, features, means, or instructions for identifying a timing for the communications with the base station based on a slot index of the first monitoring occasion and an indication of the control information

DETAILED DESCRIPTION

Figure 1:
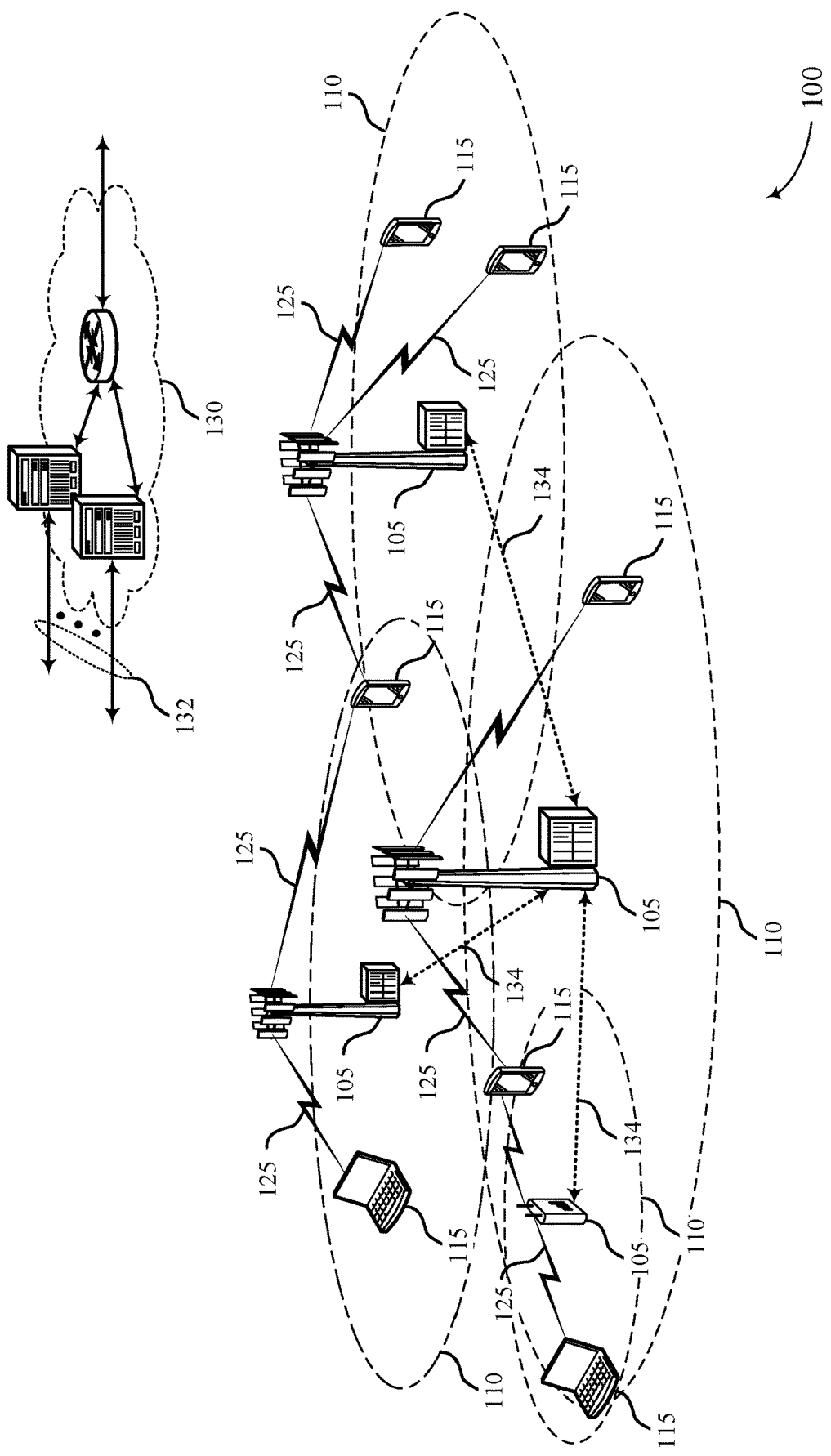
FIG. 1 illustrates an example of a system for wireless communications that supports control resource set design for bandwidth reduced low-tier user equipment (UE) in accordance with aspects of the present disclosure.

Wireless communication systems may use control information to schedule, control, or otherwise manage aspects of wireless communications between a base station and user equipment (UE). The control information may be communicated in a monitoring occasion spanning symbols of a slot. For example, the control information may be communicated in one or more control channel elements (CCE)(s), with each CCE including one or more resource element groups (REGs), e.g., each CCE may include six REGs. Broadly, each REG may include one resource block (RB) during one symbol of the slot. The control information communicated in the REGs may be communicated in a number of channels, subbands, frequencies, etc., of the slot. However, some wireless devices may be bandwidth limited such that the wireless device cannot monitor each channel, subband, frequency, etc., of the slot that the control information is being communicated in. Accordingly, it may be difficult to schedule a bandwidth limited UE for wireless communications in some wireless communication systems.

Aspects of the disclosure are initially described in the context of a wireless communication system. Generally, the described techniques provide mechanisms to support control resource configurations that are supported by a bandwidth limited UE by spreading at least a portion of the control information across more than three symbols and across multiple slots. For example, a base station may configure or otherwise map CCEs across more than three symbols. Each of the CCEs may include REGs. Some of the REGs may be mapped to a first monitoring occasion and others may be mapped to a second monitoring occasion, e.g., the CCEs may be mapped across multiple slots. The base station may transmit or otherwise convey a signal to a UE identifying the control resource set for the UE to monitor for control information scheduling communications with the base station. The base station may then transmit at least a portion (e.g., a first portion) of the control information on the REGs in the first monitoring occasion and then transmit another portion (e.g., a second portion) of the control information on the REGs in the second monitoring occasion. The control information may be spread across more than two slots. Accordingly, the UE and base station may perform wireless communications (e.g., uplink and/or downlink communications) based on the control information received in the REGs in the first and second monitoring occasions, respectively.

In another example, the all of the control information may be communicated in more than three symbols of a slot. For example, the base station may map the CCEs across more than three symbols and transmit a signal to the UE identifying or otherwise configuring the UE with the control resource set for communications. The base station may transmit the control information during the slot and over more than three symbols, which the UE and base station may then use to perform wireless communications.

Aspects of the disclosure are further illustrated by and described with reference to apparatus diagrams, system diagrams, and flowcharts that relate to control resource set design for bandwidth reduced low-tier UE.

FIG. 1 illustrates an example of a wireless communication system 100 that supports control resource set design for bandwidth reduced low-tier UE in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive a signal identifying a control resource set for the UE 115 to monitor for control information scheduling communications between the UE 115 and a base station 105, the control resource set comprising a plurality of CCEs organized across more than three symbols and comprising one or more first REGs mapped to a first monitoring occasion and one or more second REGs mapped to a second monitoring occasion. The UE 115 may receive, during the first monitoring occasion, at least a first portion of the control information on the one or more first REGs. The UE 115 may receive, during the second monitoring occasion, at least a second portion of the control information on the one or more second REGs. The UE 115 may communicate with the base station 105 in accordance with the control information.

A base station 105 may map a plurality of CCEs across more than three symbols, with the plurality of CCEs comprising one or more first REGs mapped to a first monitoring occasion and one or more second REGs mapped to a second monitoring occasion. The base station 105 may transmit a signal identifying a control resource set for a UE 115 to monitor for control information scheduling communications between the UE 115 and the base station 105, the control resource set comprising the plurality of CCEs. The base station 105 may transmit, during the first monitoring occasion, at least a first portion of the control information on the one or more first REGs. The base station 105 may transmit, during the second monitoring occasion, at least a second portion of the control information on the one or more second REGs. The base station 105 may communicate with the UE 115 in accordance with the control information.

Figure 2:
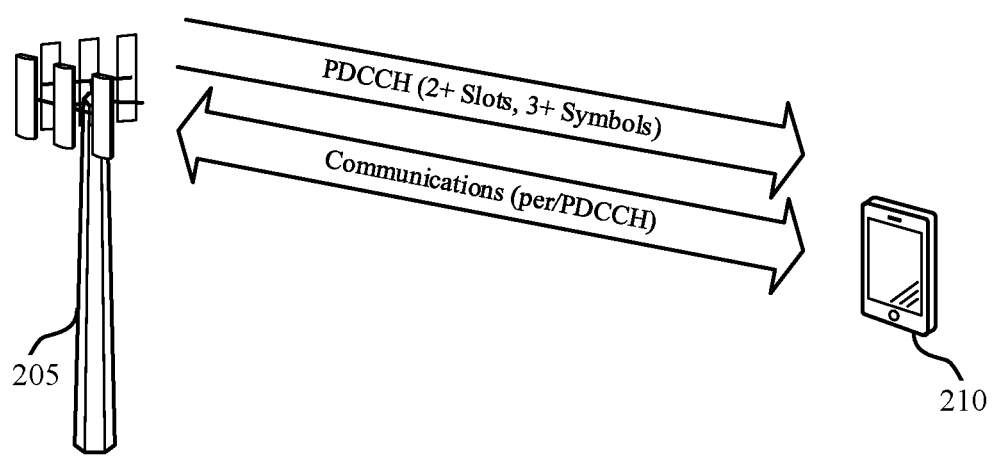
FIG. 2 illustrates an example of a wireless communication system that supports control resource set design for bandwidth reduced low-tier UE in accordance with aspects of the present disclosure.

FIG. 2 illustrates an example of a wireless communication system 200 that supports control resource set design for bandwidth reduced low-tier UE in accordance with aspects of the present disclosure. In some examples, wireless communication system 200 may implement aspects of wireless communication system 100. Wireless communication system 200 may include base station 205 and UE 210, which may be examples of corresponding devices described herein.

Wireless communication systems may use control information to monitor, configure, control, or otherwise manage various aspects of wireless communications between base station 205 and 210. The control information may be communicated on the control channel (e.g., PDCCH) and may generally provide grants (e.g., uplink grants and/or downlink grants), configuration information, etc., for such wireless communications and/or for synchronization/reference signals associated with such communications. The control information may be conveyed in a downlink control information (DCI) of the PDCCH configured to convey the relevant control information. In some wireless communication systems, the control information may be communicated in the first one, two, or three symbols of a slot and using one or more of the channels, subbands, frequencies, etc., in the slot.

Accordingly, UE 210 generally monitors for control information based on a configured control resource set (which may also be referred to as a CORESET), which may broadly include a set of time and/or frequency resources in which control information is conveyed. For example, the control resource set in some wireless communication systems is defined by a set of frequency and/or time domain resources, e.g., NRB resource blocks (RBs) in the frequency domain and $N_{symb}$ {1, 2, 3} symbols in the time domain. The PDCCH may include one or more CCEs, and each CCE may include six REGs, where a REG equals one RB during one symbol.

In some wireless communication systems, a REG within a control resource set may be numbered in increasing order in a time-first manner, starting with 0 for the first symbol and the lowest-numbered RB in the control resource set. The CCE-to-REG mapping for a control resource set may be interleaved or non-interleaved and described by REG bundles (e.g., one or more first, second, third, etc., REGs), which may be defined by a set of consecutive REGs. the REG bundle size may be configured by higher layers (e.g., RRC, MAC, etc.) and may include two, three, or six REGs per bundle. For interleaved mapping, interleaving may consist of writing REG bundles into the rectangular interleaver by rows first and then reading out my columns. The number of rows may be configured from {2, 3, 6}. In some aspects, a cyclic shift of the interleaving unit may be applied based on a configurable identifier (ID).

For example, a non-interleaved CCE-to-REG mapping into a control resource set of two symbols. Accordingly, all CCEs in the PDCCH are time and frequency localized. In another example, interleaved CCE-to-REG mapping of the control resource set in two symbols may use a REG bundle size set equal to the control resource set length, e.g., a REG bundle of two REGss may be interleaved in the frequency domain within the control resource set resources. In another example, interleaved CCE-to-REG mapping of the control resource set into symbols may use a REG bundle size set equal to six, e.g., the REG bundles are interleaved in the frequency domain within the control resource set.

However, some wireless devices may not be equipped or otherwise configured to support such techniques for communicating control information. For example, an NR-light wireless communication system may include industrial sensors, wearables, and the like, which may have reduced capabilities as compared to other wireless devices. For example, such usage scenarios may include, but are not limited to, eMMB, ultra-reliable low latency communications (URLLC), massive machine-type communications (mMTC), etc., where mMTC and URLLC may be associated with novel IoT use cases targeted in vertical industries.

The most low-end IoT services may be met by narrowband (NB)-IoT and LTE-M, but there are more high-end services that may be challenging, e.g., industrial sensors, cameras, wearables, etc. These use cases, and others, may result in the introduction of an NR-based solution with the low-end UE capabilities compared to previous legacy protocols for eMBB, URLLC, etc. That is, such a low-end UE may have a reduced number of antennas for a smaller UE form factor (e.g., one transmit/two receive, one transmit/one receive), may have a UE bandwidth reduction compared to eMBB/URLLC, may have an ultra-low UE power class for battery savings (e.g., 18 dBm peak power compared to 26 dBm), and the like. However, this may necessitate efficient coexistence with existing eMBB/URLLC UEs since the low-end (or low-tier) NR-Light UE and high-end eMBB/URLLC UEs may be in the same serving cell.

For example, a low-tier UE (such as UE 210) may have a very small bandwidth capability and/or the control resource set (e.g., CORESET #0) for a PDCCH (e.g., a control information) scheduling a system information block (SIB) one (SIB1) configured by a master information block/physical broadcast channel (MIB/PBCH) may have a maximum bandwidth of 17 MHz, for example. For example, for control information using 96 RBs with subcarrier spacing (SCS) of 15 KHz or 48 RBs with SCS of 30 KHz, the control resource set (e.g., CORESET #0) bandwidth may be larger than the maximum bandwidth (e.g., 5 MHz, 10 MHz, etc.) supported by the low-tier UE.

For a UE-specific control resource set, it may be possible to configure the UE with a small bandwidth no larger than the maximum bandwidth supported by the UE. However, it may not support an aggregation level (AL) of 16 (e.g., 16 CCEs), for example, for PDCCH (e.g., the control information) due to the constraint of a maximum of three symbols in the time duration (e.g., the three symbols that are allocated for control information within a typical slot). Example cases of the CORESET-to-CCE mapping are illustrated in Table 1 and may include, but are not limited to:

TABLE 1

|        | CORESET | #CCEs |
|--------|---------|-------|
| Case 1 | 24 × 2  | 8     |
| Case 2 | 24 × 3  | 12    |
| Case 3 | 48 × 2  | 16    |
| Case 4 | 96 × 2  | 32    |
| Case 5 | 96 × 3  | 48    |

Accordingly, aspects of the described techniques provide various mechanisms and proposals that support designing the control resource set in a manner that permits communicating such control information to a low-tier UE (such as UE 210). Broadly, aspects of the described techniques increase the time duration of the control resource set to more than three symbols. In one option, this may include all of the control resource set resources being in the same slot. For example, base station 205 may map a plurality of CCEs across more than three symbols of a slot, with the plurality of CCEs including one or more REGs mapped to the slot. Base station 205 may transmit a signal (e.g., RRC message or signaling) to UE 210 that identifies the control resource set for UE 210 to monitor for control information scheduling communications between UE 210 and base station 205. The control resource set may include the plurality of CCEs. Base station 205 then transmit the control information to UE 210 during the slot and over the more than three symbols. The control information may schedule communications between base station 205 and UE 210, which may be performed according to the control information (e.g., per/DCI in PDCCH).

In another example, the resources of the control resource set may span over multiple continuous or discontinuous (e.g., contiguous or non-contiguous) slots with the same time domain resource allocation in each slot. For example, the resources within a control resource set may be divided into a number of sub-groups (e.g., one or more first, second, third, etc., REGs) of the same size, each with a duration of one, two, or three symbols, and mapped to the slots using a one-to-one mapping in each slot or using a more-than-one REG subgroup mapping in each slot.

Accordingly, base station 205 may map a plurality of CCEs across more than three symbols, with the plurality of CCEs including one or more first REGs mapped to a first monitoring occasion and one or more second REGs mapped to a second monitoring occasion (although more than two slots may be used). Base station 205 may then transmit a signal to UE 210 that indicates or otherwise identifies the control resource set that includes the plurality of CCEs. The base station may transmit at least a portion (e.g., a first portion) of the control information during the first monitoring occasion and in the one or more first REGs and another portion (e.g., a second portion) of the control information during the second monitoring occasion and in the one or more second REGs. UE 210 may receive the control information conveyed in the first monitoring occasion and the second monitoring occasion, and in the respective REGs, and use the control information for communicating with base station 205.

Figure 3:
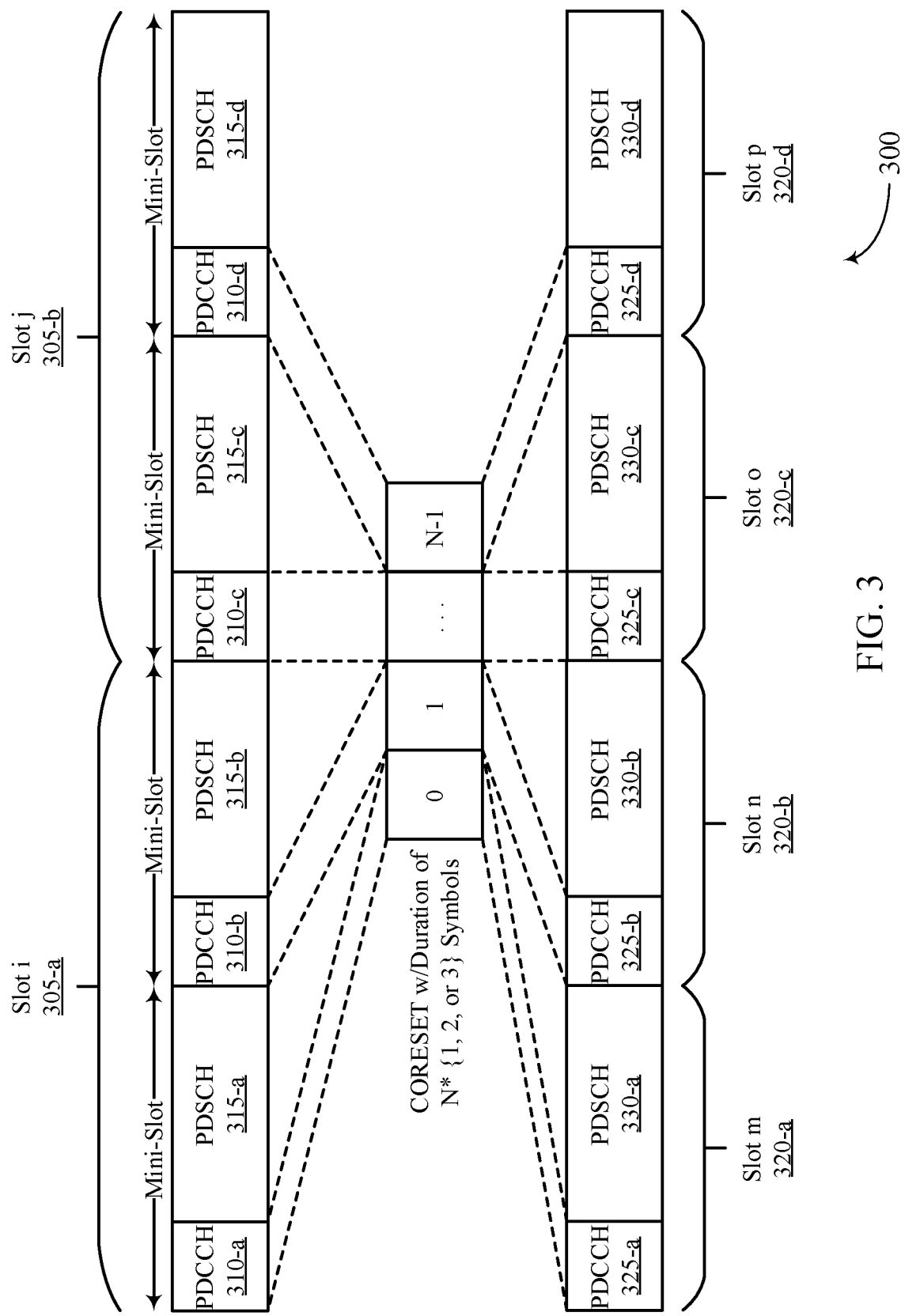
FIG. 3 illustrates an example of a resource configuration that supports control resource set design for bandwidth reduced low-tier UE in accordance with aspects of the present disclosure.

FIG. 3 illustrates an example of a resource configuration 300 that supports control resource set design for bandwidth reduced low-tier UE in accordance with aspects of the present disclosure. In some examples, resource configuration 300 may implement aspects of wireless communication systems 100 and/or 200. Aspects of resource configuration 300 may be implemented by a base station and/or UE, which may be examples of the corresponding devices described herein. Resource configuration 300 illustrates examples of how a control resource set can be mapped into multiple slots.

As discussed, a base station may map the REGs from a plurality of CCEs across more than three symbols and across two or more slots. In the example illustrated in resource configuration 300, the plurality of CCEs are organized into a plurality of subgroups of CCEs. As an example, the CCEs may be organized into four subgroups (e.g., subgroup #0, subgroup #1, through subgroup #N-1). Each subgroup may include one or more CCEs, and may be mapped to one, two, or three symbols. It is to be understood that there may be more or less than four subgroups of CCEs of the control resource set. Each CCE of the plurality of CCEs may include a corresponding one or more REGs. The REGs are mapped to different slots, as illustrated in FIG. 3, though the REGs of a single CCE are included within a same slot. The slot, in this context, may generally refer to a full slot or a mini-slot.

In one example, the resource configuration 300 may include the base station mapping one or more REGs of a first subgroup of CCEs (e.g., subgroup #0), a second subgroup of CCEs (e.g., subgroup #1), a third subgroup of CCEs (e.g., an intervening subgroup), and a fourth subgroup of CCEs (e.g., subgroup #N-1) to a first mini-slot of slot 305-a (e.g., slot i), to a second mini slot of slot 305-a, to a first mini-slot of slot 305-b (e.g., slot j), and to a second mini-slot of slot 305-b, respectively. Each mini-slot of slots 305 may include a control portion 310 (e.g., PDCCH) and a data portion 315 (e.g., PDSCH), with the one or more REGs of the CCEs being mapped to the control portion 310 (e.g., in DCIs within each control portion 310). Each control portion 310 may include a symbol duration of one, two, or three symbols.

In another example, the resource configuration 300 may include the base station mapping one or more REGs of a first subgroup of CCEs (e.g., subgroup #0), a second subgroup of CCEs (e.g., subgroup #1), a third subgroup of CCEs (e.g., an intervening subgroup), and a fourth subgroup of CCEs (e.g., subgroup #N-1) to a first monitoring occasion 320-a (e.g., slot m), to a second monitoring occasion 320-b (e.g., slot n), to a third slot 320-c (e.g., slot o), and to a fourth slot 320-d (e.g., slot p), respectively. Each of slots 320 may include a control portion 325 (e.g., PDCCH) and a data portion 330 (e.g., PDSCH), with the one or more REGs of the CCEs being mapped to the control portion 325 (e.g., in DCIs within the control portions 325). Each control portion 325 may include a symbol duration of one, two, or three symbols.

The base station may transmit a signal to the UE that conveys an indication identifying the control resource set for the UE to monitor for control information for performing communications between the UE and the base station. The control resource set may include the plurality of CCEs, with the one or more REGs being mapped across multiple slots. The base station may then transmit the control information across the one or more REGs of the CCEs that are mapped to the different slots.

For example, the base station may transmit a first portion of the control information on one or more REGs during the control portion 310-a of the first mini-slot of slot 305-a, a second portion of the control information on one or more REGs during the control portion 310-*b* of the second mini-slot of slot 305-*a*, a third portion of control information on one or more REGs during the control portion 310-*c* of the first mini-slot of slot 305-*b*, and a fourth portion of the control information on one or more REGs of the second mini-slot of slot 305-*b*.

In another example, the base station may transmit a first portion of the control information on one or more REGs during the control portion 325-*a* of slot 320-*a*, a second portion of the control information on one or more REGs during the control portion 325-*b* of slot 320-*b*, a third portion of the control information on one or more REGs during the control portion 325-*c* of slot 320-*c*, and a fourth portion of the control information on one or more REGs during the control portion 325-*d* of slot 320-*d*.

Broadly, the UE may use the control resource set to monitor for control information from the base station that schedules wireless communications between the UE and the base station. For example, the control information may carry grants, configurations, etc., associated with the wireless communications between the base station and UE. The base station and UE may use the control information to perform wireless communications (e.g., uplink and/or downlink communications).

Accordingly, the base station may spread the control information out across three or more symbols and across multiple slots. In some aspects, the base station may spread the control information out using only a subset of the available carriers in each slot, e.g., to support a bandwidth reduced or low-tier UE.

Figure 4:
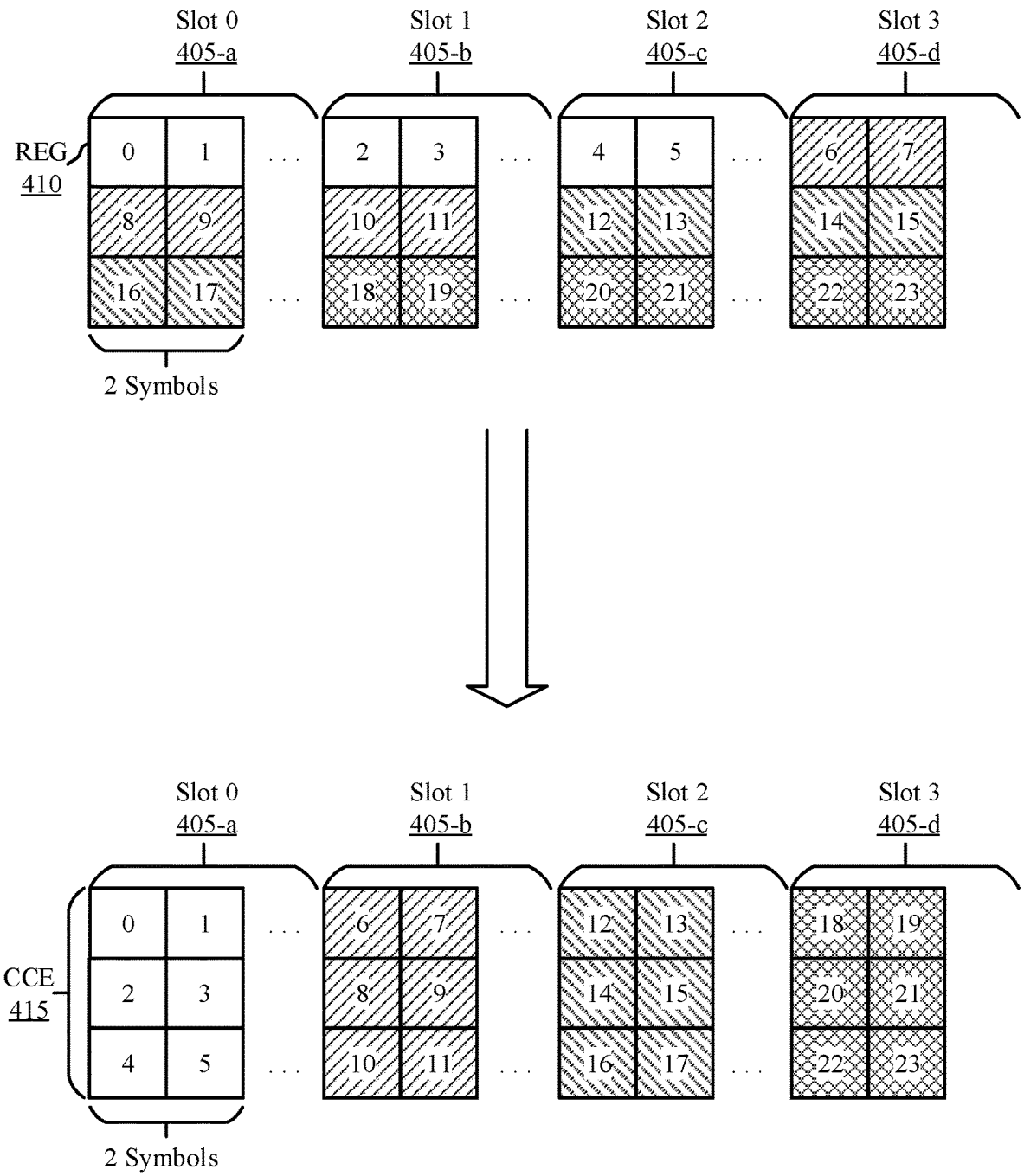
FIG. 4 illustrates an example of a resource configuration that supports control resource set design for bandwidth reduced low-tier UE in accordance with aspects of the present disclosure.

FIG. 4 illustrates an example of a resource configuration 400 that supports control resource set design for bandwidth reduced low-tier UE in accordance with aspects of the present disclosure. In some examples, resource configuration 400 may implement aspects of wireless communication systems 100 and/or 200, and/or resource configuration 300. Aspects of resource configuration 400 may be implemented by a base station and/or UE, which may be examples of corresponding devices described herein. Broadly, resource configuration 300 illustrates an example of aspects of REG numbering when a control resource set is spread out across multiple slots (or mini-slots), in accordance with aspects of the described techniques.

As discussed, the base station may configure a control resource set for a UE to monitor for control information scheduling communications between the UE and the base station. The control resource set may include a plurality of CCEs 415 across at least four symbols and with the plurality of CCEs 415 including REGs 410 mapped to different slots 405. The example resource configuration 400 illustrates an example with four CCEs 415, and each CCE 415 including six REGs 410. That is, the example resource configuration 400 includes one CCE 415 including REGs 410 {0, 1, 2, 3, 4, 5}, a second CCE 415 including REGs 410 {6, 7, 8, 9, 10, 11}, a third CCE 415 including REGs 410 {12, 13, 14, 15, 16, 17}, and a fourth CCE 415 including REGs 410 {18, 19, 20, 21, 22, 23}. Broadly, REG numbering may include REG indices, e.g., a REG 410 #7 of the second CCE 415 may also be referred to a REG 410, index 7.

In some wireless communication systems, REG numbering and/or interleaving may create issues when the control information is spread out across multiple slots. For example (and as is illustrated in the top example of resource configuration 400), the REGs 410 within a CCE of a control resource set may be numbered in increasing order in a time-first manner across all of the (mini-)slots 405 and REG interleaving may be performed across all of the REGs 410 within a control resource set. The top example of resource configuration 400 illustrates an example of non-interleaved CCE-to-REG mapping for a control resource set spanning eight symbols distributed over four slots 405 (e.g., slot 405-*a*, slot 405-*b*, slot 405-*c*, and slot 405-*d*) using legacy REG numbering. However, this may be problematic since the REGs 410 of a CCE 415 are distributed over multiple slots, thus meaning that the UE will wait until all of the slots are received in order to decode the control information (e.g., PDCCH), which increases PDCCH decoding latency.

For example, (again referring to the top example of a legacy REG numbering scheme) the UE would wait until it has received the first slot 405-*a* (e.g., slot 0), the second slot 405-*b* (e.g., slot 1), and the third slot 405-*c* (e.g., slot 2) before it can decode all of the REGs 410 of the first CCE 415. The UE would have to wait until it had received the fourth slot 405-*d* (e.g., slot 3) before it could decode all of the REGs 410 of the remaining CCEs 415 in the control resource set. This would introduce considerable PDCCH decoding delays.

Accordingly, aspects of the described techniques may provide a novel approach for REG numbering when the control resource set is spread over multiple slots or mini-slots. Broadly, REG numbering in accordance with aspects of the described techniques may include numbering the REGs first in increasing order of symbol indices within a single mapping occasion, second in increasing order frequency RB resource indices, third in increasing order of indices for time-multiplexed mapping occasions within a slot 405, and fourth in increasing order of indices for the slots 405, where a mapping occasion is defined by a set of consecutive OFDM symbols within a slot 405 for control resource set mapping.

Accordingly, the base station may map one or more REGs 410 with a corresponding REG index that is based on the increasing order of symbol indices of a slot 405. The base station may then map the one or more REGs 410 with a corresponding REG index that is based on an increasing order of frequency RB resource indices within the slot 405. The base station may then map the one or more REGs 410 with a corresponding REG index that is based on an increasing order of indices for the plurality of slots 405.

Accordingly and as is shown in the bottom example of resource configuration 400, the base station may number the REGs 410 according to these techniques to ensure that the REGs 410 included in the first slot 405-*a* (e.g., slot 0) can be decoded by the UE without having to wait for the REGs 410 in the subsequent slots 405. That is, in accordance with the example REG numbering scheme illustrated in the bottom example of resource configuration 400, the UE can decode all of the REGs 410 received in each slot 405 without having to wait to receive the REGs 410 in the next slot 405. This may enable the UE to decode each portion of the control information received in each slot 405, thus improving PDCCH decoding latency.

The base station may transmit a first portion of the control information on one or more REGs 410 during the first slot 405-*a*, a second portion of the control information on one or more REGs 410 during the second slot 405-*b*, a third portion of control information on one or more REGs 410 during the third slot 405-*c*, and a fourth portion of the control information on one or more REGs 410 during a fourth slot 405-*d*. The UE may receive the portions of the control information spread across the plurality of slots 405 and use the control information to perform wireless communications with the base station.

Figure 5:
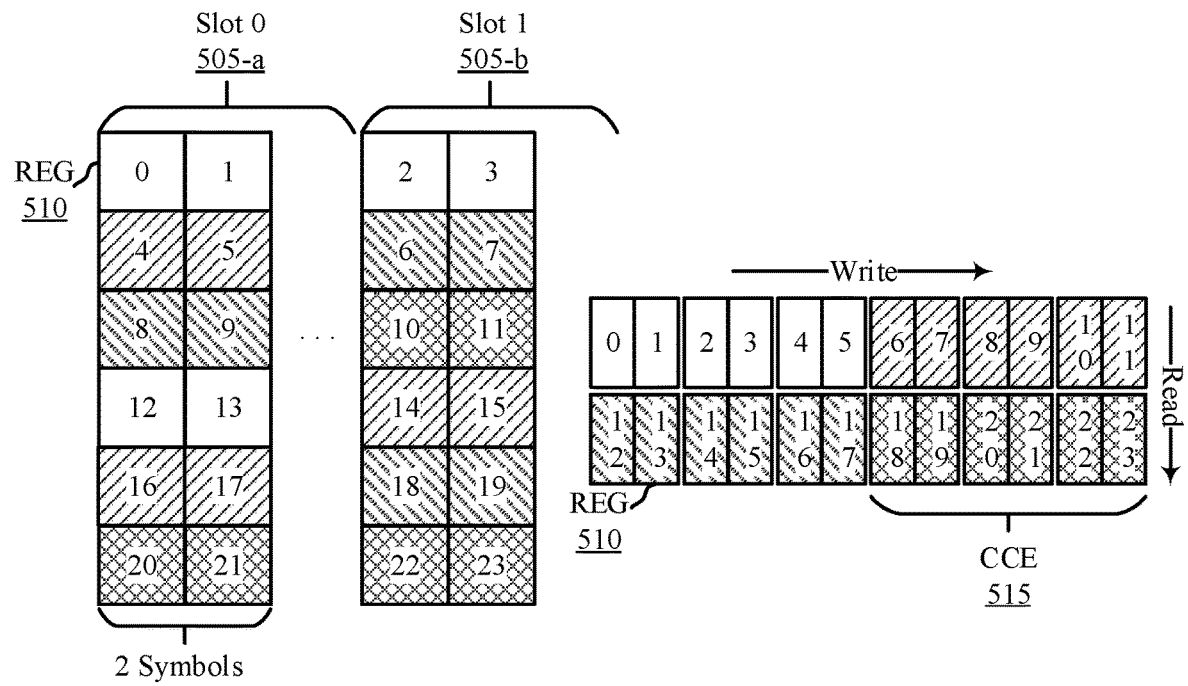
FIG. 5 illustrates an example of a resource configuration that supports control resource set design for bandwidth reduced low-tier UE in accordance with aspects of the present disclosure.
Figure 5:
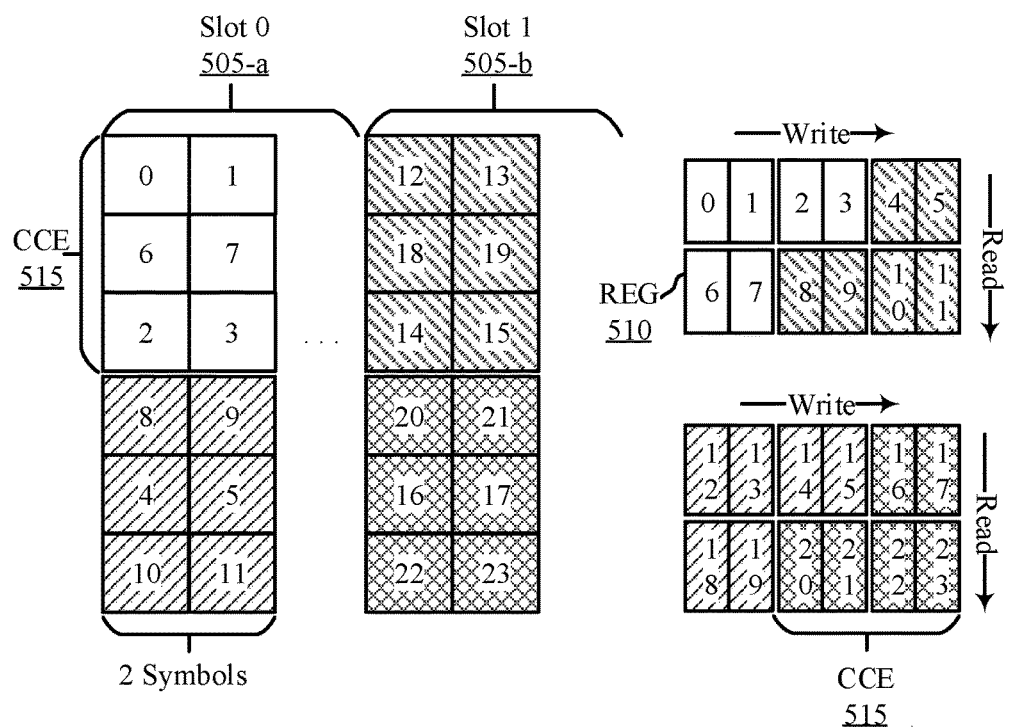

FIG. 5 illustrates an example of a resource configuration 500 that supports control resource set design for bandwidth reduced low-tier UE in accordance with aspects of the present disclosure. In some examples, resource configuration 500 may implement aspects of wireless communication systems 100 and/or 200, and/or resource configurations 300 and/or 400. Aspects of resource configuration 500 may be implemented by a base station and/or UE, which may be examples of corresponding devices described herein. Broadly, resource configuration 500 illustrates an example of aspects of REG numbering when a control resource set is spread out across multiple slots (or mini-slots), in accordance with aspects of the described techniques.

As discussed, the base station may configure a control resource set for a UE to monitor for control information scheduling communications between the UE and the base station. The control resource set may include a plurality of CCEs 515 across at least four symbols and with the plurality of CCEs 515 including one or more REGs 510 mapped to different slots 505. The example resource configuration 500 illustrates an example with four CCEs 515, and each CCE 515 including six REGs 510.

In some wireless communication systems, REG numbering and/or interleaving may be problematic. For example (and as is illustrated in the top example of resource configuration 500), the REGs 510 within a CCE of a control resource set may be numbered in increasing order in a time-first manner across all of the (mini-)slots 505 and REG interleaving may be performed across all of the REGs 510 within a control resource set. That is, the top example of resource configuration 500 illustrates an example of interleaved CCE-to-REG mapping with the number of interleaving rows set to two for a control resource set spanning four symbols distributed over two slots 505 (e.g., a first slot 505-a and a second slot 505-b) using legacy REG numbering and interleaving. In this top example, there is no cyclic shift applied and the control resource set CCE mapping in the sets of REG bundles is discontinuous in both time and frequency. That is, the legacy example at the top of resource configuration 500 includes a first CCE 515 including REGs 510 {0, 1, 2, 3, 12, 13}, a second CCE 515 including REGs 510 {4, 5, 14, 15, 16, 17}, a third CCE 515 including REGs 510 {6, 7, 8, 9, 18, 19}, and a fourth CCE 515 including REGs 510 {10, 11, 20, 21, 22, 23}. Broadly, REG numbering may include REG indices, e.g., a REG 510 #7 of the second CCE 515 may also be referred to a REG 510, index 7. However, this may be problematic since the REGs 510 of a CCE 515 are distributed over multiple slots 505 and the UE will wait to receive all of the slots 505 in order to decode the control information (e.g., PDCCH), which increases PDCCH decoding latency.

For example, (again referring to the top example legacy REG numbering scheme) the UE would have to wait until it has received both the first slot 505-a (e.g., slot 0) and the second slot 505-b (e.g., slot 1) before it can decode all of the REGs 510 of the CCEs 515. This would introduce considerable PDCCH decoding delays.

Accordingly, aspects of the described techniques may provide a novel approach for REG numbering when the control resource set is spread over multiple slots or mini-slots. Broadly, REG numbering in accordance with aspects of the described techniques may include numbering the REGs first in increasing order of symbol indices within a single mapping occasion, second in increasing order of frequency RB resource indices, third in increasing order of indices for time-multiplexed mapping occasions within a slot 505, and fourth in increasing order of indices for the slots 505, where a mapping occasion is defined by a set of consecutive OFDM symbols within a slot 505 for control resource set mapping.

Accordingly, the base station may map one or more REGs 510 with a corresponding REG index that is based on the increasing order of symbol indices of a slot 505. The base station may then map the one or more REGs 510 with a corresponding REG index that is based on an increasing order of frequency RB resource indices within the slot 505. The base station may then map the one or more REGs 510 with a corresponding REG index that is based on an increasing order of indices for the plurality of slots 505.

In terms of interleaving, the base station may map the one or more REGs 510 with a corresponding interleaver pattern that is based on the REGs 510 within a slot 505. For example, interleaving a control resource set may include interleaving being applied separately for each REG 510 subgroup so that all of the REGs 510 are interleaved in the frequency domain within a REG 510 subgroup and no interleaving is performed across REG 510 subgroups or time domain resources, e.g., limited diversity gain from interleaving compared to interleaving within the control resource set. The interleaving pattern within a REG 510 subgroup may be based on the REG 510 bundling size that is configured from {2, 3, or 6} and the interleaver unit size may be configured from {2, 3, or 6}.

Accordingly and as is shown in the bottom example of resource configuration 500, the base station may number the REGs 510 according to these techniques to ensure that the REGs 510 included in the first slot 505-a (e.g., slot 0) can be decoded by the UE without having to wait for the REGs 510 in the second slot 505-b (e.g., slot 1). That is, in accordance with the example REG numbering scheme illustrated in the bottom example of resource configuration 500, the UE can decode all of the REGs 510 received in each slot 505 without having to wait to receive the REGs 510 in the next slot 505. This may enable the UE to decode each portion of the control information received in each slot 505, thus improving PDCCH decoding latency.

Moreover, the base station may interleave the REGs 510 in the first slot 505-a separately from the REGs 510 in the second slot 505-b. Interleaving may be performed by writing the REGs 510 by row first and then reading the REGs 510 by column next.

Accordingly, the example illustrated in the bottom of resource configuration 500 provides an interleaved CCE-to-REG mapping with the number of interleaving rows set to two for a control resource set spanning four symbols and distributed over two slots using the REG 510 numbering and interleaving techniques described herein. No cyclic shift is applied and the CCE 515 mapping in the sets of REG 510 bundles may discontinue only in frequency. That is, the example at the bottom of resource configuration 500 includes a first CCE 515 including REGs 510 {0, 1, 6, 7, 2, 3}, a second CCE 515 including REGs 510 {8, 9, 4, 5, 10, 11}, a third CCE 515 including REGs 510 {12, 13, 18, 19, 14, 15}, and a fourth CCE 515 including REGs 510 {20, 21, 16, 17, 22, 23}.

The base station may transmit a first portion of the control information on one or more REGs 510 during the first slot 505-a and a second portion of the control information on one or more REGs 510 during the second slot 505-b. The UE may receive the portions of the control information spread across the plurality of slots 505 and use the control information to perform wireless communications with the base station.

Figure 6:
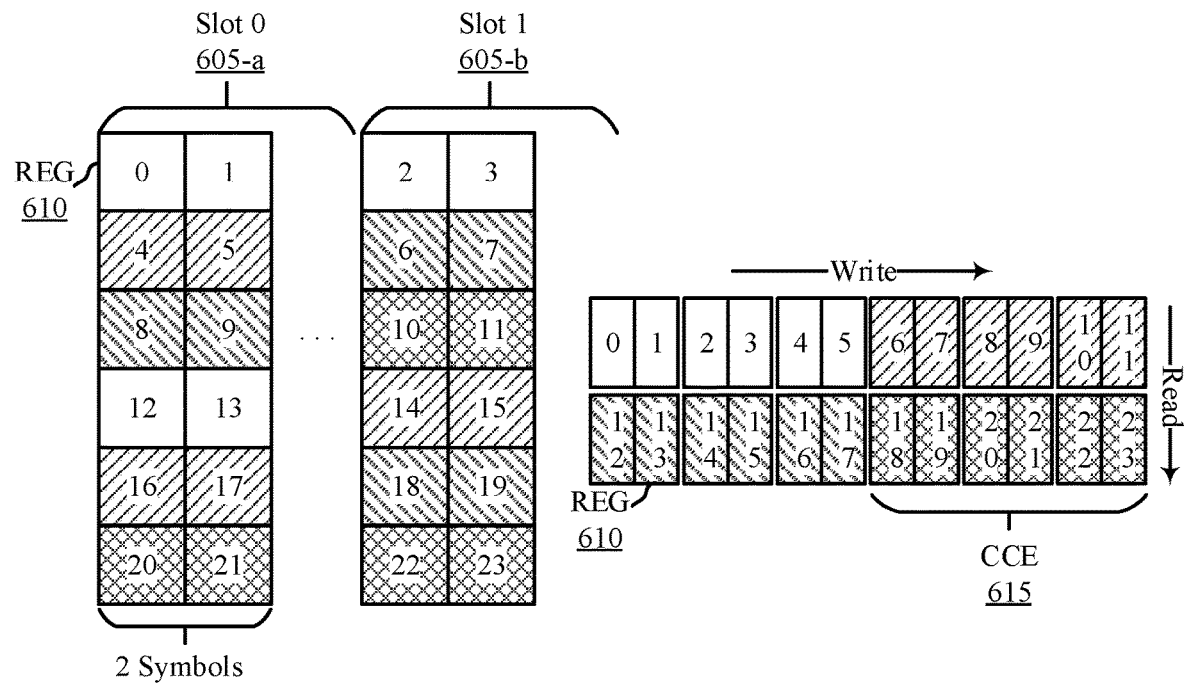
FIG. 6 illustrates an example of a resource configuration that supports control resource set design for bandwidth reduced low-tier UE in accordance with aspects of the present disclosure.
Figure 6:
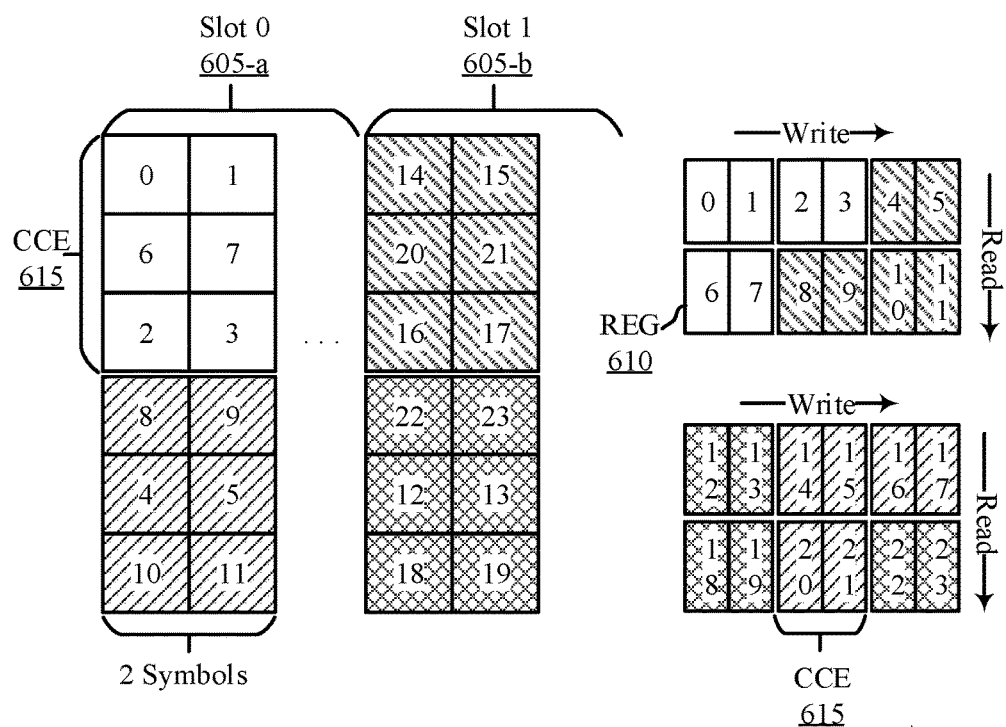

FIG. 6 illustrates an example of a resource configuration 600 that supports control resource set design for bandwidth reduced low-tier UE in accordance with aspects of the present disclosure. In some examples, resource configuration 600 may implement aspects of wireless communication systems 100 and/or 200, and/or resource configurations 300, 400 and/or 500. Aspects of resource configuration 600 may be implemented by a base station and/or UE, which may be examples of corresponding devices described herein. Broadly, resource configuration 600 illustrates an example of aspects of REG numbering when a control resource set is spread out across multiple slots (or mini-slots), in accordance with aspects of the described techniques.

As discussed, the base station may configure a control resource set for a UE to monitor for control information scheduling communications between the UE and the base station. The control resource set may include a plurality of CCEs 615 across at least four symbols and with the plurality of CCEs 615 including one or more REGs 610 (e.g., a REG bundle of subgroup) mapped to different slots 605. The example resource configuration 600 illustrates an example with four CCEs 615, and each CCE 615 including six REGs 610.

In some wireless communication systems, REG numbering and/or interleaving may be problematic. For example (and as is illustrated in the top example of resource configuration 600), the REGs 610 within a CCE of a control resource set may be numbered in increasing order in a time-first manner across all of the (mini-)slots 605 and REG 610 interleaving may be performed across all of the REGs 610 within a control resource set. That is, the top example of resource configuration 600 illustrates an example of interleaved CCE-to-REG mapping with the number of interleaving rows set to two for a control resource set spanning four symbols distributed over two slots 605 (e.g., a first slot 605-a and a second slot 605-b) using legacy REG numbering and interleaving. In this top example, there is no cyclic shift applied and the control resource set CCE mapping in the sets of REG bundles is discontinuous in both time and frequency. That is, the legacy example at the top of resource configuration 600 includes a first CCE 615 including REGs 610 {0, 1, 2, 3, 12, 13}, a second CCE 615 including REGs 610 {4, 5, 14, 15, 16, 17}, a third CCE 615 including REGs 610 {6, 7, 8, 9, 18, 19}, and a fourth CCE 615 including REGs 610 {10, 11, 20, 21, 22, 23}. Broadly, REG numbering may include REG indices, e.g., a REG 610 #7 of the second CCE 615 may also be referred to a REG 610, index 7. However, this may be problematic since the REGs 610 of a CCE 615 are distributed over multiple slots 605 and the UE will wait to receive all of the slots 605 in order to decode the control information (e.g., PDCCH), which increases PDCCH decoding latency.

For example, (again referring to the top example legacy REG numbering scheme) the UE would have to wait until it has received both the first slot 605-a (e.g., slot 0) and the second slot 605-b (e.g., slot 1) before it can decode all of the REGs 610 of the CCEs 615. This would introduce considerable PDCCH decoding delays.

Accordingly, aspects of the described techniques may provide a novel approach for REG numbering when the control resource set is spread over multiple slots or mini-slots. Broadly, REG numbering in accordance with aspects of the described techniques may include numbering the REGs 610 first in increasing order of symbol indices within a single mapping occasion, second in increasing order of frequency RB resource indices, third in increasing order of indices for time-multiplexed mapping occasions within a slot 605, and fourth in increasing order of indices for the slots 605, where a mapping occasion is defined by a set of consecutive OFDM symbols within a slot 605 for control resource set mapping.

Accordingly, the base station may map one or more REGs 610 with a corresponding REG index that is based on the increasing order of symbol indices of a slot 605. The base station may then map the one or more REGs 610 with a corresponding REG index that is based on an increasing order of frequency RB resource indices within the slot 605. The base station may then map the one or more REGs 610 with a corresponding REG index that is based on an increasing order of indices for the plurality of slots 605.

In terms of interleaving, the base station may map the one or more REGs 610 with a corresponding interleaver pattern that is based on the REGs 510 within a slot 605. For example, interleaving a control resource set may include interleaving being applied separately for each REG 610 subgroup so that all of the REGs 610 are interleaved in the frequency domain within a REG 610 subgroup and no interleaving is performed across REG 610 subgroups or time domain resources, e.g., limited diversity gain from interleaving compared to interleaving within the control resource set. The interleaving pattern within a REG 610 subgroup may be based on the REG 610 bundling size that is configured from {2, 3, or 6} and the interleaver unit size may be configured from {2, 3, or 6}. That is, the base station may interleave the REGs 610 in the first slot 605-a separately from the REGs 610 in the second slot 605-b. Interleaving may be performed by writing the REGs 610 by row first and then reading the REGs 610 by column next.

In terms of a cyclic shift, the base station may apply a cyclic shift to the interleaved REGs 610 of the first slot 605-a and the interleaved REGs 610 of the second slot 605-b that is based on the identifiers (IDs) of the corresponding REG 610 and/or the slot indices for the first slot 605-a and the second slot 605-b. That is, the bottom example of resource configuration 600 illustrates an example interleaved CCE-to-REG mapping with two interleaving rows for a control resource set of four symbols distributed over two slots 605 using the REG numbering and interleaving schemes described herein. The bottom example of resource configuration 600 may use a slot-specific cyclic shift for interleaving, and the CCE 615 mapping in the sets of REG 610 bundles may discontinue only in frequency.

Accordingly and as is shown in the bottom example of resource configuration 600, the base station may number, interleave, and cyclically shift the REGs 610 according to these techniques to ensure that the REGs 610 included in the first slot 605-a (e.g., slot 0) can be decoded by the UE without having to wait for the REGs 610 in the second slot 605-b (e.g., slot 1). That is, in accordance with the example REG numbering scheme illustrated in the bottom example of resource configuration 600, the UE can decode all of the REGs 610 received in each slot 605 without having to wait to receive the REGs 610 in the next slot 605. That is, the example at the bottom of resource configuration 600 includes a first CCE 615 including REGs 610 {0, 1, 6, 7, 2, 3}, a second CCE 615 including REGs 610 {8, 9, 4, 5, 10, 11}, a third CCE 615 including REGs 610 {14, 15, 20, 21, 16, 17}, and a fourth CCE 615 including REGs 610 {22, 23, 12, 13, 18, 19}. This may enable the UE to decode each portion of the control information received in each slot 605, thus improving PDCCH decoding latency.

That is, the example illustrated in the bottom of resource configuration 600 provides an interleaved CCE-to-REG mapping with the number of interleaving rows set to two for a control resource set spread across four symbols and distributed over two slots using the REG 610 numbering, interleaving, and cyclic shifting techniques described herein. The cyclic shift is applied on a per-slot 605 basis and the CCE 615 mapping in the sets of REG 610 bundles may discontinue only in frequency. The cyclic shift of the interleaving unit may be based on both the configurable identifier and the slot 610 (or mini-slot) index, e.g., supporting REG 610 subgroup specific cyclic shift for interleaving.

The base station may transmit a first portion of the control information on one or more REGs 610 during the first slot 605-*a* and a second portion of the control information on one or more REGs 610 during the second slot 605-*b*. The UE may receive the portions of the control information spread across the plurality of slots 605 and use the control information to perform wireless communications with the base station.

Figure 7:
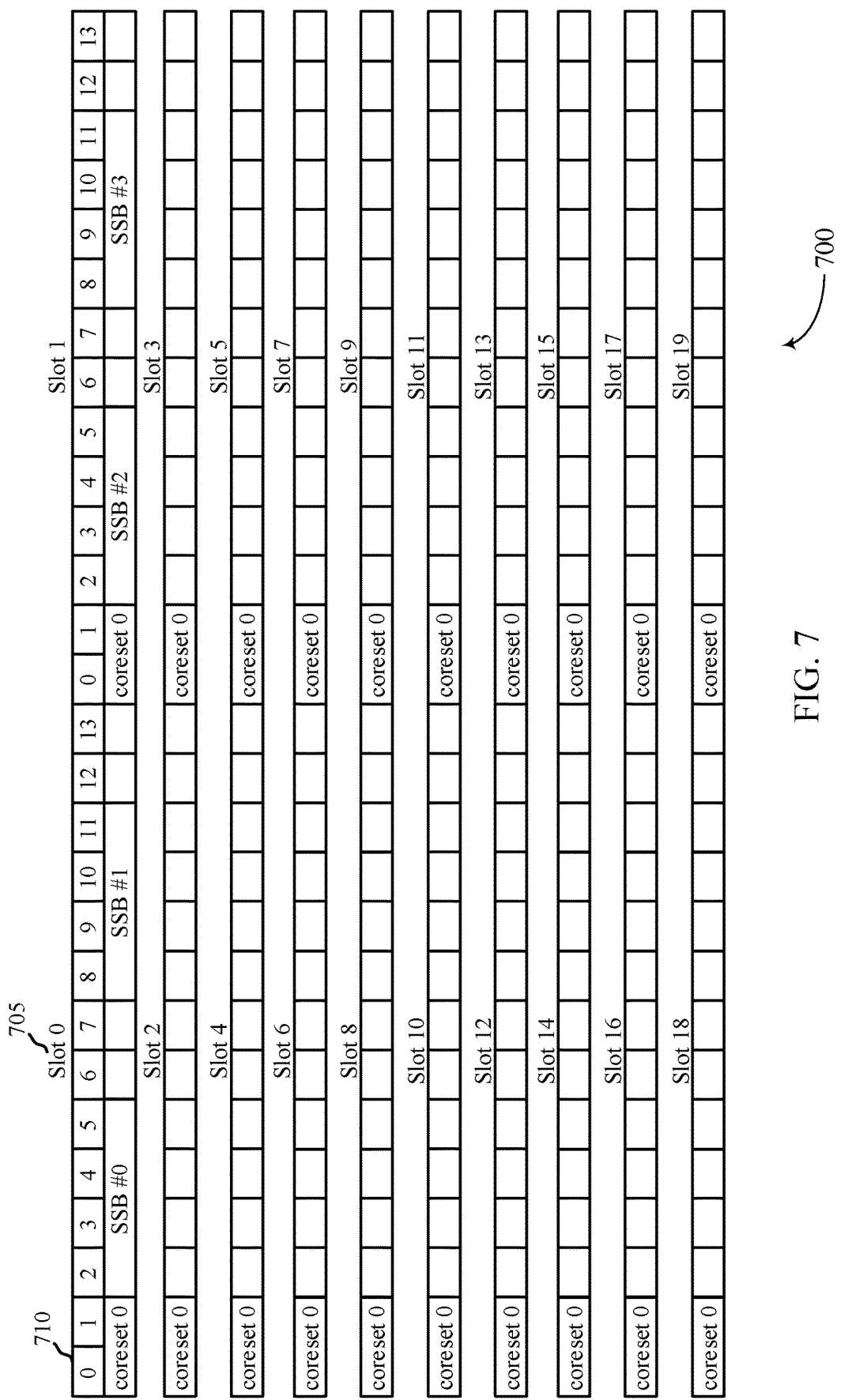
FIG. 7 illustrates an example of a resource configuration that supports control resource set design for bandwidth reduced low-tier UE in accordance with aspects of the present disclosure.

FIG. 7 illustrates an example of a resource configuration 700 that supports control resource set design for bandwidth reduced low-tier UE in accordance with aspects of the present disclosure. In some examples, resource configuration 700 may implement aspects of wireless communication systems 100 and/or 200, and/or resource configurations 300, 400, 500 and/or 600. Aspects of resource configuration 700 may be implemented by a base station and/or UE, which may be examples of corresponding devices described herein. Broadly, resource configuration 700 illustrates an example of aspects of a regular wideband control resource set (e.g., CORESET #0) and a narrowband control resource set (e.g., CORESET #0) being TDM in different slots, in accordance with aspects of the described techniques.

More particularly, resource configuration 700 illustrates an example of a regular wideband control resource set and a narrowband control resource set being TDM in different slots 705 in a 20 ms period for a total of four SSBs, assuming a 15 KHz subcarrier spacing (SCS) for both SSB and PDCCH and one search space within a slot 705. For example, the control resource set (e.g., CORESET #0) may be spread across the first two symbols 710 of each slot 705 (e.g., in each of slots 0-19), with the 20 slots 705 covering 20 ms. In some aspects, the control information mapped to the control resource sets spread across the 20 slots 705 may include or carry information (e.g., schedule SSB transmissions for SSBs #0-#3) scheduling communications between the UE and base station. The base station may transmit portions of the control information across each slot 705, which can then be used for wireless communications between the UE and base station.

Figure 8:
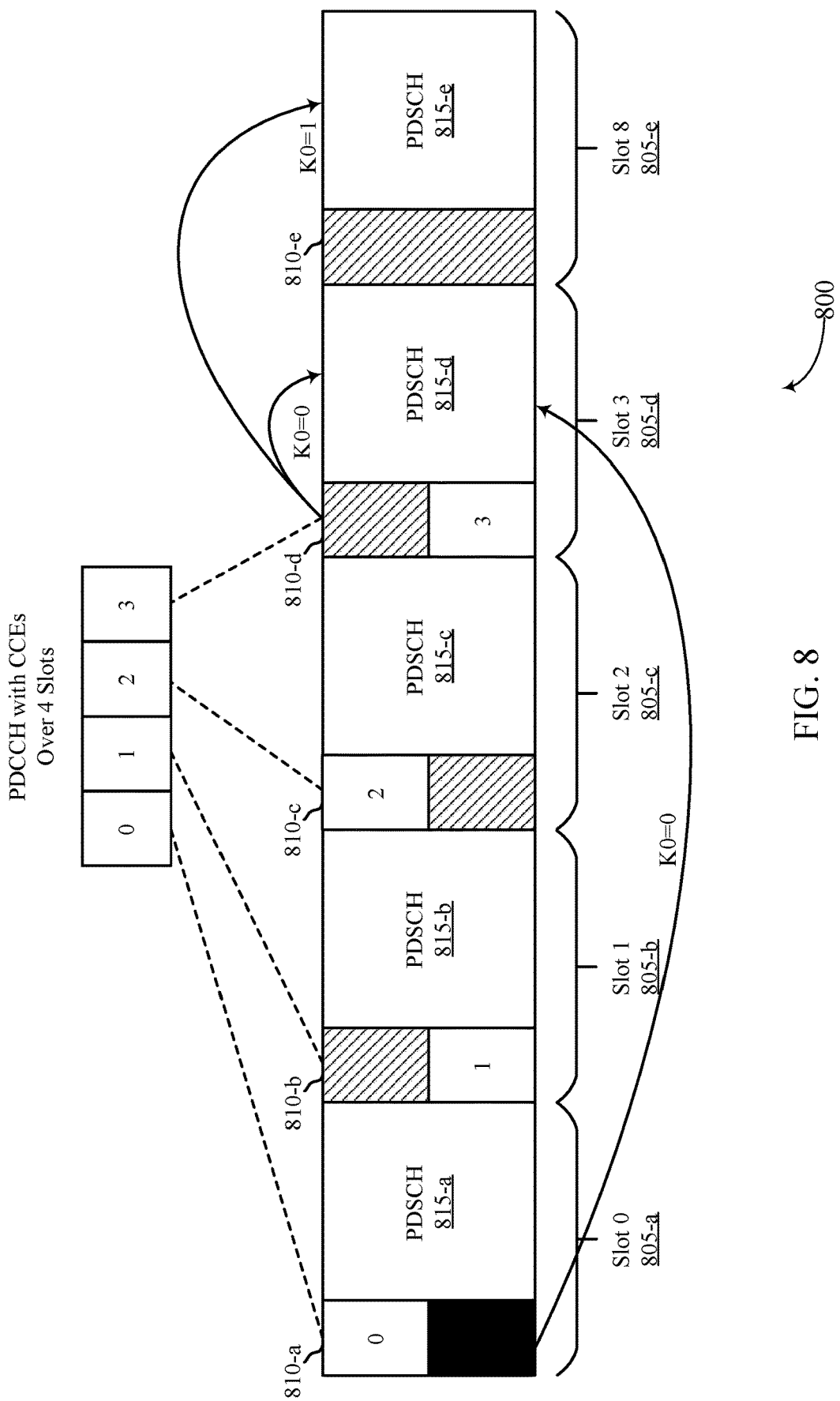
FIG. 8 illustrates an example of a resource configuration that supports control resource set design for bandwidth reduced low-tier UE in accordance with aspects of the present disclosure.

FIG. 8 illustrates an example of a resource configuration 800 that supports control resource set design for bandwidth reduced low-tier UE in accordance with aspects of the present disclosure. In some examples, resource configuration 800 may implement aspects of wireless communication systems 100 and/or 200, and/or resource configurations 300, 400, 500, 600, and/or 700. Aspects of resource configuration 800 may be implemented by a base station and/or UE, which may be examples of corresponding devices described herein. Broadly, resource configuration 800 illustrates an example where CCEs are spread over four slots 805, with each slot 805 having a corresponding control portion 810 and data portion 815.

The base station may map the REG(s) of the CCEs of the control resource set over a first slot 805-*a*, a second slot 805-*b*, a third slot 805-*c*, and a fourth slot 805-*d*. Accordingly, the base station may transmit a first portion of the control information in a first control portion 810-*a* (e.g., a DCI) of the first slot 805-*a*, a second portion of the control information in a second control portion 810-*b* of the second slot 805-*b*, a third portion of the control information in a third control portion 810-*c* of the third slot 805-*c*, and a fourth portion of the control information in a fourth control portion 810-*d* of the fourth slot 805-*d*. The control information may be carried in DCIs of the respective control portions 810.

Some wireless communication systems may include a K0 value indicated in the DCI that signals the delay between the scheduling PDCCH (e.g., the control portion 810 of the slot 805) and the scheduled PDSCH (e.g., the data portion 815 (PDSCH) scheduled by the DCI). Moreover, some wireless communication systems may support a dynamic PDSCH (e.g., data portion 815) scheduling delay, e.g., the start of the PDSCH transmission is K0 slots 805 after the slot 805 with the scheduling DCI, where K0 is indicated in the DCI. However, this may present issues when the control information is spread over multiple slots 805. For example, when the control information is spread over multiple slots 805, this may create an issue with respect to which DCI in which slot 805 is used to schedule the corresponding PDSCH (e.g., data portion 815).

Accordingly, aspects of the described techniques may include the base station indicating a timing for the communications with the UE based on the timing of a first slot 805-*a* (e.g., slot 0) and a duration indication in the control information and/or indicating a timing for the communications with the UE based on the timing of a second slot 805-*b*.

That is, for a control resource set spread over multiple slots 805, the CCEs of a PDCCH (e.g., DCI in a control portion 810) may be distributed over the multiple slots 805. Therefore, the PDCCH slot used for determining the PDSCH transmission timing may be the last slot 805 of the scheduling PDCCH (e.g., the slot 805 with a highest CCE index of the PDCCH) or may use the first monitoring occasion of the scheduling PDCCH plus a duration of PDCCH indicated in the DCI.

For the option where the first slot 805 (e.g., slot 805-*a*) of the scheduling PDCCH plus a duration of the PDCCH explicitly indicated in the DCI, this may include the first portion of the control information in the control portion 810-*a* of the first slot 805-*a* indicating that K0=0 and that the duration of the PDCCH (e.g., the indication of the number of slots 805 in which the control resource set is distributed) spans four slots (e.g., slots 805-*a*, 805-*b*, 805-*c*, and 805-*d*). Accordingly, the next slot 805 (e.g., slot 805-*e*) following receipt of the final slot carrying the control information (based on K0=0) may include the communications (e.g., PDSCH) scheduled by the control information.

For the option where the last slot 805 of the scheduling PDCCH (e.g., the fourth slot 805-*d*) is used for determining PDSCH transmission timing, this may include indicating the timing for the communications with the UE based on the timing of the fourth slot 805-*d*. For example, the portion of the control information in the fourth slot 805-*d* may indicate that K0=0 for the communications (e.g., PDSCH) occurring in the data portion 815-*d* of the fourth slot 805-*d* and may indicate that K0=1 for the communications occurring in the data portion 815-*e* of a fifth slot 805-*e*.

For this option, there may be ambiguity between different aggregation levels (ALs). For example, there may be an ambiguity between AL8 and AL16 PDCCH candidates (e.g., since the lowest coding rate by Polar coding for PDCCH is ⅛ and if the coding rate of PDCCH with AL8 is lower than ⅛), the UE might not be able to differentiate between AL8 and AL16 since AL16 adds another repetition further based on circular buffering and the former eight CCEs and later eight CCEs (in AL16) are the same. So, if a detected PDCCH scheduling the PDSCH has an AL8, the UE may assume the starting slot of PDSCH may be based on the last slot of an AL16 PDCCH candidate.

More particularly, according to some wireless communication systems, when the UE monitors the PDCCH in a UE-specific search space, the CCEs corresponding to the PDCCH candidate (given as m) of the AL (given as L) are given by:

$$L * \left\{ \left( Y_k + \left[ \frac{m_{n_{CI}} * N_{CCE,p}}{L * M_{max}^{(L)}} \right] + n_{CI} \right) \mod [N_{CCE,p} / L] \right\} + i$$

where $Y_k$ is a function of the slot index used to determine the starting CCE index of a PDCCH, i=0, . . . , L-1, and m=0, . . . , $M^{(L)}$-1, where $M^{(L)}$ is the number of PDCCH candidates to monitor for AL L. $N_{CCE,p}$ is the total number of CCEs in the control resource set p and $n_{CI}$ is the carrier indicator field.

When a control resource set is mapped to multiple slots 805, it would be ambiguous which slot index is used to determine the value of $Y_k$, e.g., the starting CCE index of a PDCCH. However, aspects of the described techniques may use the first monitoring occasion of the control resource set to determine the starting CCE index of the PDCCH candidate (e.g., the value of $Y_k$). The base station may select a slot index of the first monitoring occasion and identify the first CCE index of the set of CCEs in the control resource set based on the slot index. The base station may identify, based on the first REG, a first time resource within the first slot 805-a to transmit the first portion of the control information and transmit the second portion of the control information during a second time resource in the second slot 805-b that is based on the time resource within the first slot 805-a. The time resources in the first slot 805-a and the second slot 805-b may be the same or may be different. Accordingly, the base station may transmit the portions of the control information in the control resource set across the four slots 805, with the slot index of the first slot 805-a for the control resource set being used to determine the timing for the communications between the base station and UE.

Figure 9:
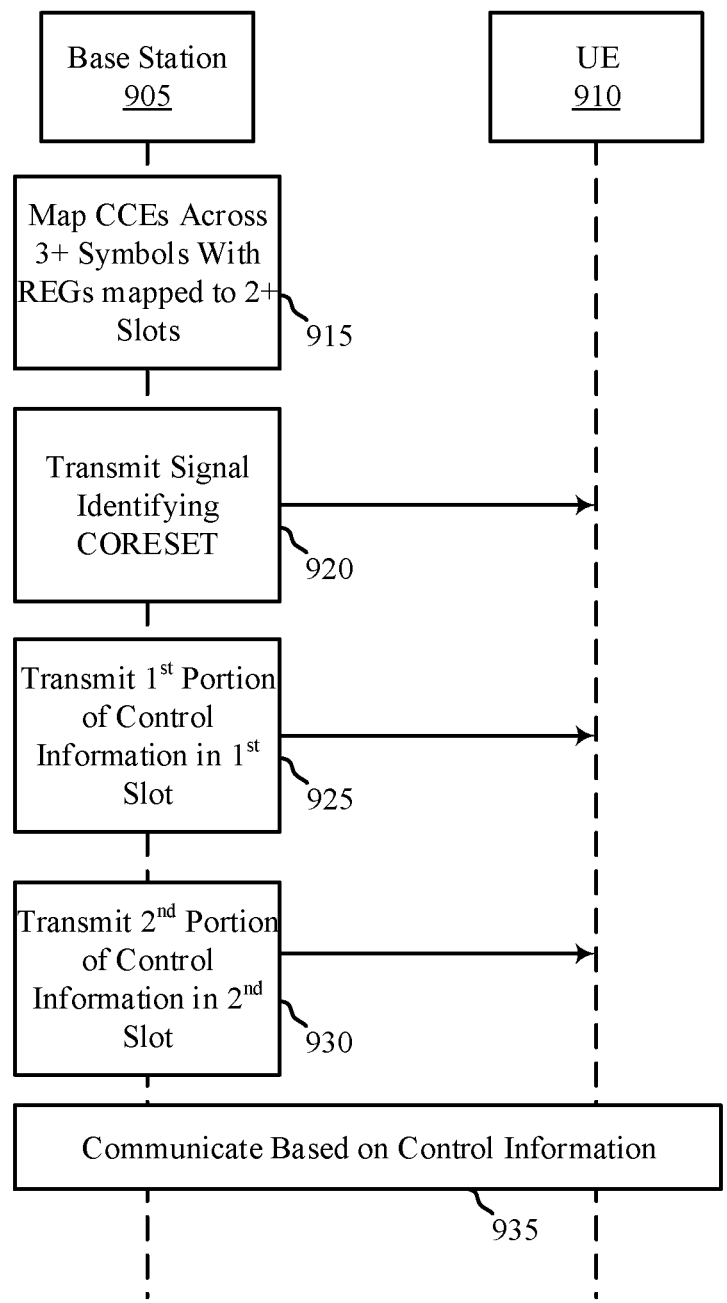
FIG. 9 illustrates an example of a process that supports control resource set design for bandwidth reduced low-tier UE in accordance with aspects of the present disclosure.

FIG. 9 illustrates an example of a process 900 that supports control resource set design for bandwidth reduced low-tier UE in accordance with aspects of the present disclosure. In some examples, process 900 may implement aspects of wireless communication systems 100 and/or 200 and/or resource configurations 300, 400, 500, 600, 700, 800, and/or 900. Process 900 may be implemented by base station 905 and/or UE 910, which may be examples of corresponding devices described herein.

At 915, base station 905 may map a plurality of CCEs across more than three symbols, with the plurality of CCEs including one or more first REGs (e.g., a first REG subgroup) mapped to a first monitoring occasion and one or more second REGs (e.g., a second REG subgroup) mapped to a second monitoring occasion. In some aspects, the first monitoring occasion and the second monitoring occasion may be contiguous or non-contiguous slots, is a same slot or a different slot, mini-slots, or full slots, etc.

At 920, base station 905 may transmit (and UE 910 may receive) a signal identifying the control resource set for UE 910 to monitor for control information scheduling communications between UE 910 and base station 905. In some aspects, the control resource set may include the plurality of CCEs. In some aspects, the signal may be a higher layer signal (e.g., RRC, MAC, etc.).

At 925 and during the first monitoring occasion, base station 905 may transmit (and UE 910 may receive) at least a first portion of the control information on the one or more first REGs.

In some aspects, this may include base station 905 transmitting (and UE 910 receiving) the first portion of the control information over two or more control portions of the first monitoring occasion (e.g., in two or more mini-slots within the first monitoring occasion). Accordingly, base station 905 may transmit (and UE 910 may receive) the second portion of the control information over two or more control portions of the second monitoring occasion (e.g., in two or more mini-slots within the second monitoring occasion).

In some aspects, this may include base station 905 mapping the one or more first REGs with a corresponding REG index that is further based on an increasing order of symbol indexes within the first monitoring occasion. Base station 905 may map the one or more first REGs with a corresponding REG index that is further based on an increasing order of frequency RB resource indexes within the first monitoring occasion. Base station 905 may map the one or more first REGs with a corresponding REG index that is further based on an increasing order of indexes for time-multiplexed control portions of the first monitoring occasion. Base station 905 may map the one or more REGs with a corresponding REG index that is based on an increasing order of indexes for the first monitoring occasion and the second monitoring occasion.

In some aspects, base station 905 may map the one or more first REGs with a corresponding interleaver pattern that is based on the one or more first REGs within the first monitoring occasion. Base station 905 may interleave the one or more first REGs of the first monitoring occasion separately from the one or more second REGs of the second monitoring occasion. This may include base station 905 applying a cyclic shift to the interleaved one or more first REGs of the first monitoring occasion and the interleaved one or more second REGs of the second monitoring occasion. The cyclic shift may be based on a first identifier for the one or more first REGs, a second identifier for the one or more second REGs, a slot index for the first monitoring occasion, and/or a second index for the second monitoring occasion.

In some aspects, this may include base station 905 indicating a timing for the communications with UE 910 based on a timing of the first monitoring occasion and a duration indication in the control information.

In some aspects, one or more first REGs comprise a first CCE and the one or more second REGs comprise a second CCE, wherein the first CCE is different from the second CCE.

At 930 and during a second monitoring occasion, base station 905 may transmit (and UE 910 may receive) at least the second portion of the control information on the one or more second REGs. In some aspects, this may include base station 905 indicating a timing for the communications with UE 910 based on a timing of the second monitoring occasion.

In some aspects, this may include base station 905 identifying a slot index of the first monitoring occasion and identifying the first CCE index of the set of CCEs in the control resource set based on the slot index.

In some aspects, the one or more first REGs comprise a first CCE and the one or more second REGs comprise a second CCE, wherein the first CCE is different from the second CCE.

At 935, base station 105 and UE 910 may communicate according to the control information.

Figure 10:
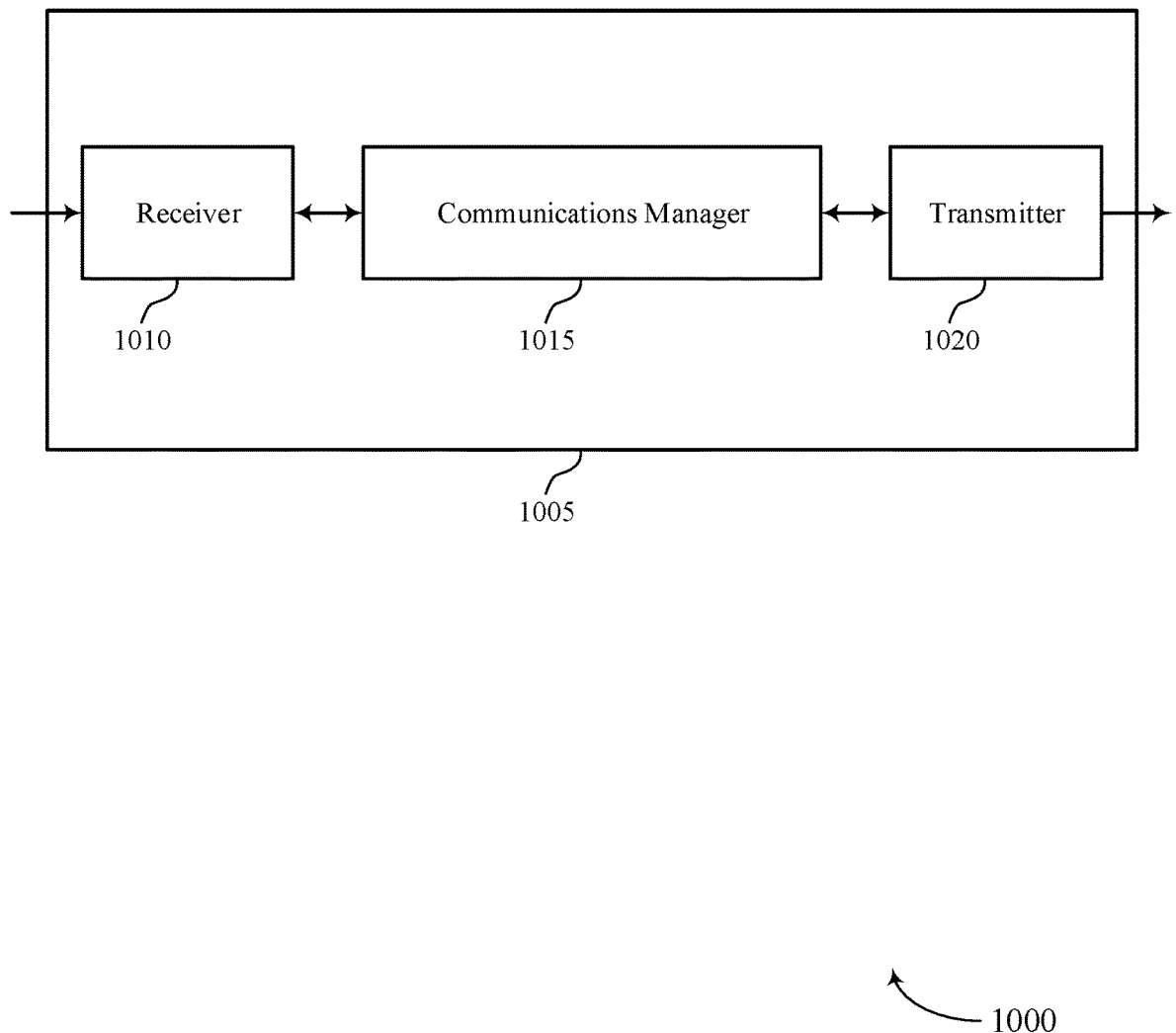
FIGS. 10 and 11 show block diagrams of devices that support control resource set design for bandwidth reduced low-tier UE in accordance with aspects of the present disclosure.

FIG. 10 shows a block diagram 1000 of a device 1005 that supports control resource set design for bandwidth reduced low-tier UE in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to control resource set design for bandwidth reduced low-tier UE, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receive, during the first monitoring occasion, at least a first portion of the control information on the one or more first REGs, receive, during the second monitoring occasion, at least a second portion of the control information on the one or more second REGs, and communicate with the base station in accordance with the control information.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
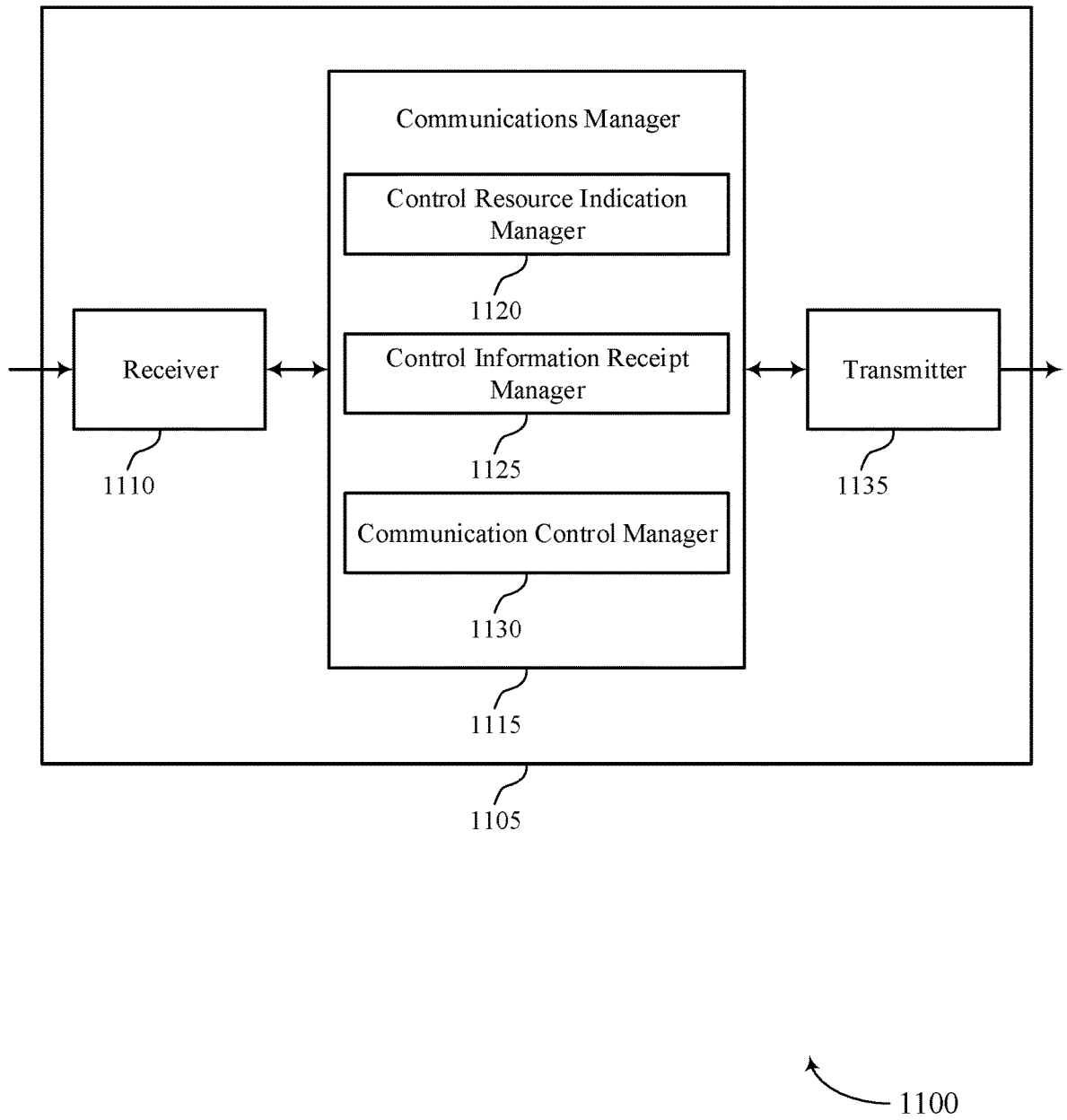

FIG. 11 shows a block diagram 1100 of a device 1105 that supports control resource set design for bandwidth reduced low-tier UE in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to control resource set design for bandwidth reduced low-tier UE, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control resource indication manager 1120, a control information receipt manager 1125, and a communication control manager 1130. The communications manager 1115 may be an example of aspects of the communications manager 1310 described herein.

The control resource indication manager 1120 may receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion.

The control information receipt manager 1125 may receive, during the first monitoring occasion, at least a first portion of the control information on the one or more first REGs and receive, during the second monitoring occasion, at least a second portion of the control information on the one or more second REGs.

The communication control manager 1130 may communicate with the base station in accordance with the control information.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
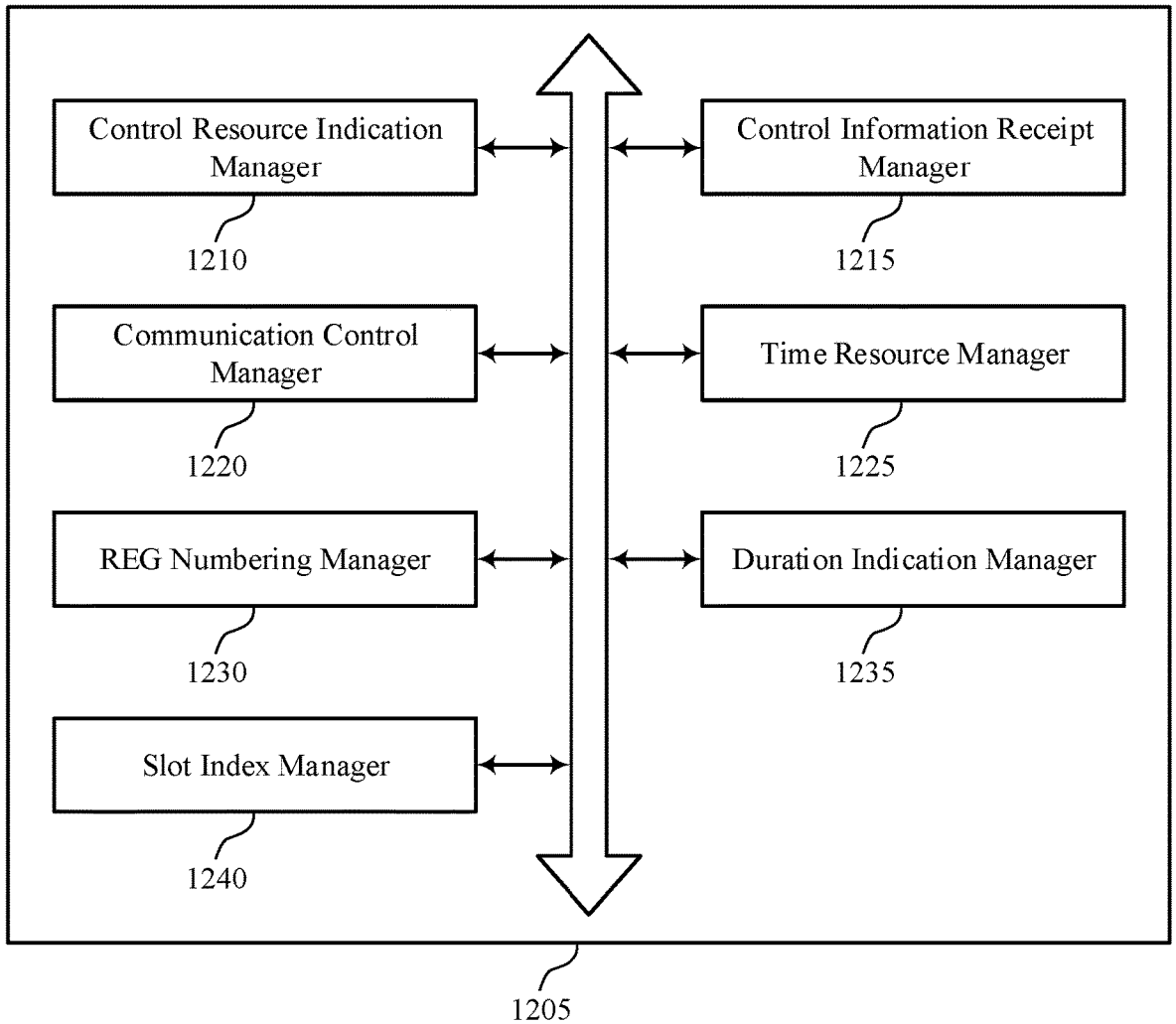
FIG. 12 shows a block diagram of a communications manager that supports control resource set design for bandwidth reduced low-tier UE in accordance with aspects of the present disclosure.

FIG. 12 shows a block diagram 1200 of a communications manager 1205 that supports control resource set design for bandwidth reduced low-tier UE in accordance with aspects of the present disclosure. The communications manager 1205 may be an example of aspects of a communications manager 1015, a communications manager 1115, or a communications manager 1310 described herein. The communications manager 1205 may include a control resource indication manager 1210, a control information receipt manager 1215, a communication control manager 1220, a time resource manager 1225, a REG numbering manager 1230, a duration indication manager 1235, and a slot index manager

1240. Each of these modules may communicate, directly or indirectly, with one another (e.g., via one or more buses).

The control resource indication manager 1210 may receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion.

In some examples, the control resource indication manager 1210 may receive a signal identifying a control resource set for the UE to monitor for control information scheduling communications between the UE and a base station, the control resource set including a set of CCEs organized across more than three symbols of a slot, each of the set of CCEs including one or more REGs.

The control information receipt manager 1215 may receive, during the first monitoring occasion, at least a first portion of the control information on the one or more first REGs. In some examples, the control information receipt manager 1215 may receive, during the second monitoring occasion, at least a second portion of the control information on the one or more second REGs. In some examples, the control information receipt manager 1215 may receive, during the slot, the control information over the more than three symbols of the slot. In some cases, the first monitoring occasion is a same or a different slot than the second monitoring. In some cases, the first monitoring occasion is in a different slot than the second monitoring occasion and the control information receipt manager 1215 may identify a timing for the communications with the base station based on a slot index of the first monitoring occasion and an indication of the control information.

The communication control manager 1220 may communicate with the base station in accordance with the control information. In some examples, the communication control manager 1220 may communicate with the base station in accordance with the control information.

In some cases, the one or more first REGs comprise a first CCE and the one or more second REGs comprise a second CCE, wherein the first CCE is different from the second CCE.

The REG numbering manager 1230 may identify the one or more first REGs based on a corresponding REG index that is based on an increasing order of symbol indices of the first monitoring occasion. In some examples, the REG numbering manager 1230 may identify the one or more first REGs based on the corresponding REG index that is further based on an increasing order of frequency resource block resource indices within the first monitoring occasion.

In some examples, the REG numbering manager 1230 may identify the one or more first REGs based on the corresponding REG index that is further based on an increasing order of indices of the first monitoring occasion and the second monitoring occasion. In some examples, the REG numbering manager 1230 may identify the one or more first REGs based on an interleaver pattern that is further based on the one or more first REGs within the first monitoring occasion.

In some examples, the REG numbering manager 1230 may deinterleave the one or more first REGs of the first monitoring occasion separately from the second one or more REGs of the second monitoring occasion. In some examples, the REG numbering manager 1230 may identify a cyclic shift applied to the interleaved one or more first REGs of the first monitoring occasion and one or more second REGs of the second monitoring occasion, where the cyclic shift is based on at least one of a first identifier for the one or more first REGs, or a second identifier for the one or more second REGs, or a slot index for the first monitoring occasion, or a second index for the second monitoring occasion, or a combination thereof.

The slot index manager 1240 may identify a slot index of the first monitoring occasion. In some examples, the slot index manager 1240 may identify the first CCE index of the set of CCEs in the control resource set based on the slot index.

Figure 13:
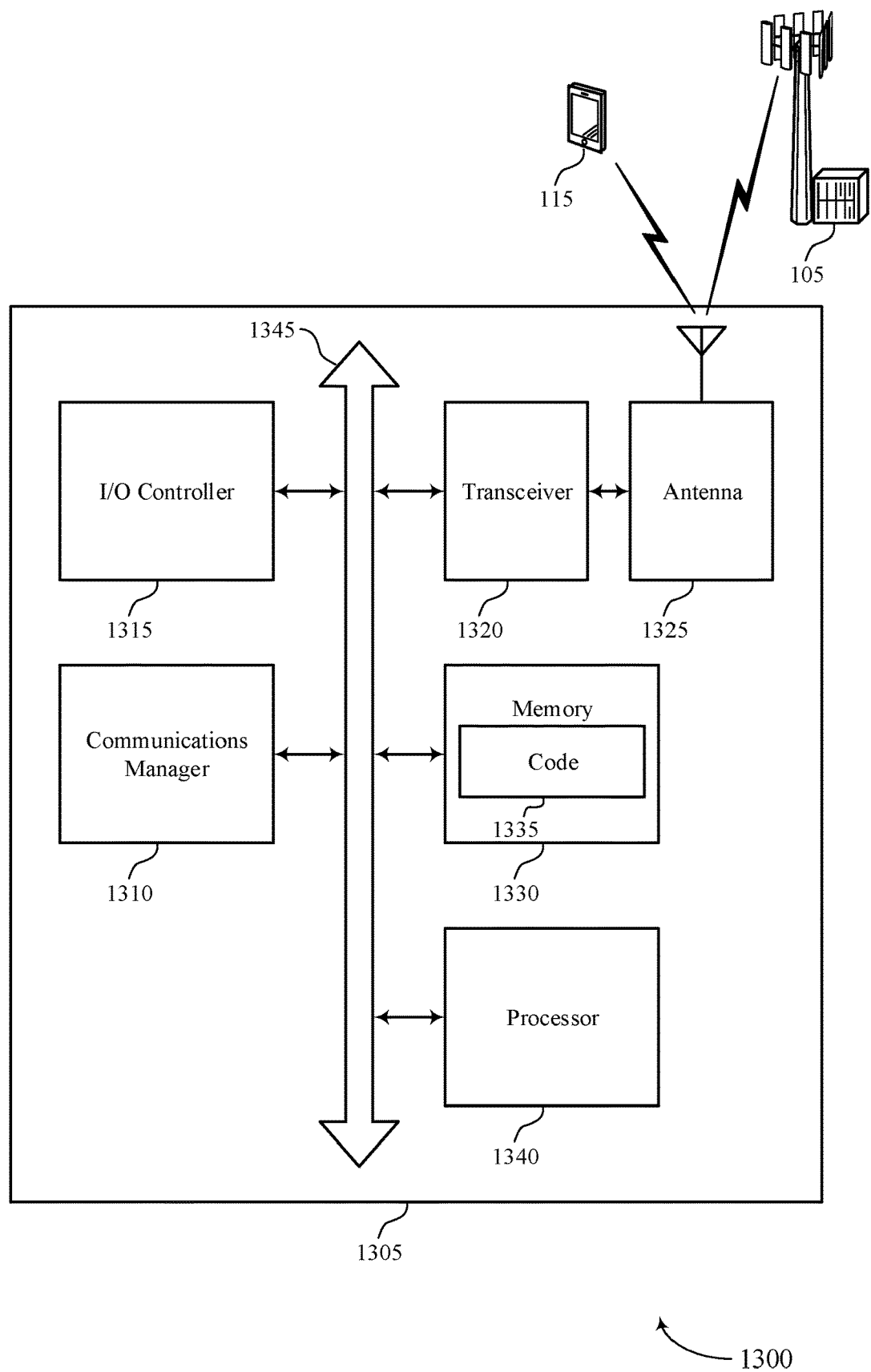
FIG. 13 shows a diagram of a system including a device that supports control resource set design for bandwidth reduced low-tier UE in accordance with aspects of the present disclosure.

FIG. 13 shows a diagram of a system 1300 including a device 1305 that supports control resource set design for bandwidth reduced low-tier UE in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion, receive, during the first monitoring occasion, at least a first portion of the control information on the one or more first REGs, receive, during the second monitoring occasion, at least a second portion of the control information on the one or more second REGs, and communicate with the base station in accordance with the control information.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting control resource set design for bandwidth reduced low-tier UE).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
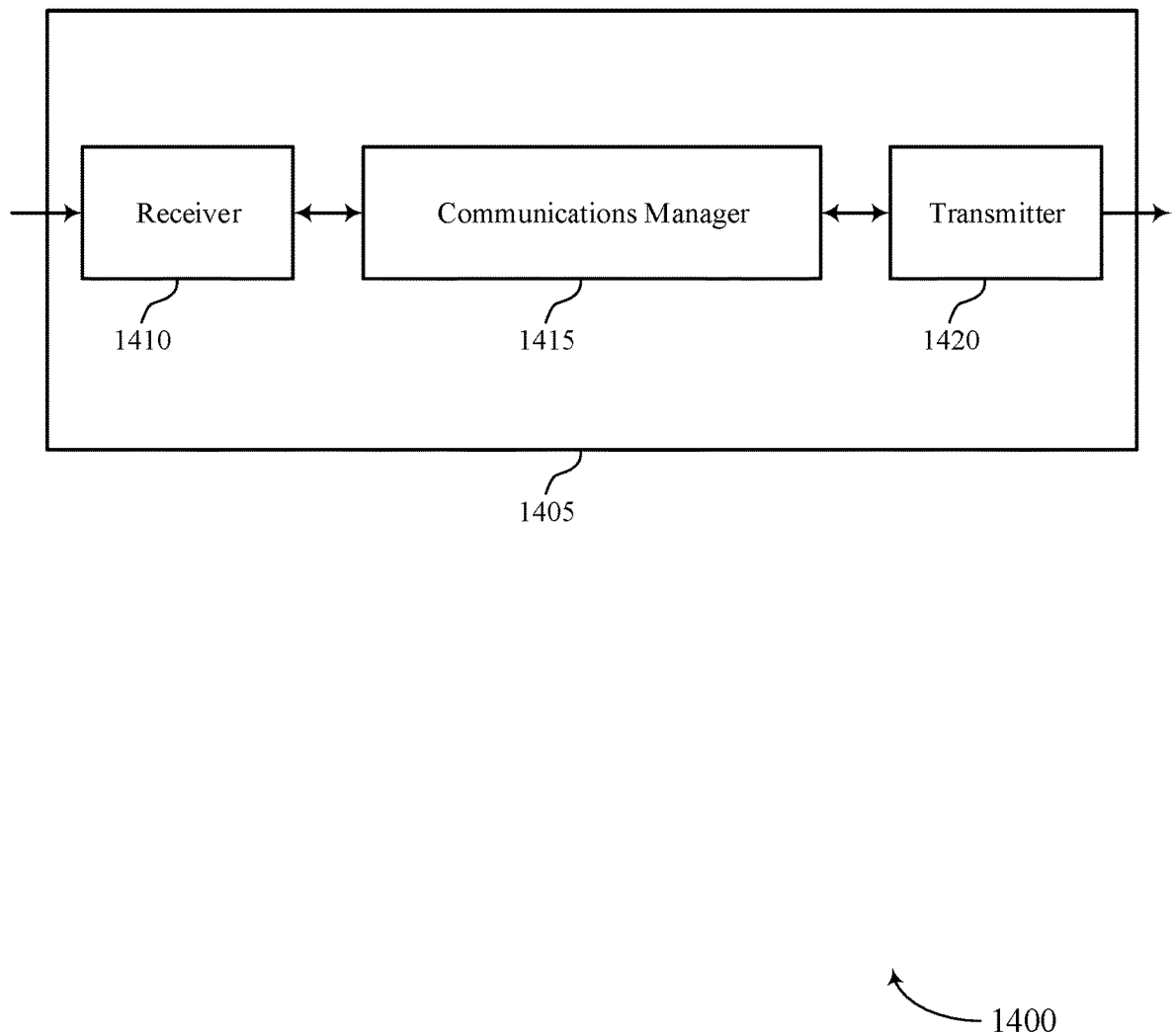
FIGS. 14 and 15 show block diagrams of devices that support control resource set design for bandwidth reduced low-tier UE in accordance with aspects of the present disclosure.

FIG. 14 shows a block diagram 1400 of a device 1405 that supports control resource set design for bandwidth reduced low-tier UE in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to control resource set design for bandwidth reduced low-tier UE, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may map a set of CCEs across more than three symbols, with the set of CCEs including one or more first REGs mapped to a first monitoring occasion and one or more second REGs mapped to a second monitoring occasion, transmit a signal identifying a control resource set for a UE to monitor for control information scheduling communications between the UE and the base station, the control resource set including the set of CCEs, transmit, during the first monitoring occasion, at least a first portion of the control information on the one or more first REGs, transmit, during the second monitoring occasion, at least a second portion of the control information on the one or more second REGs, and communicate with the UE in accordance with the control information.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
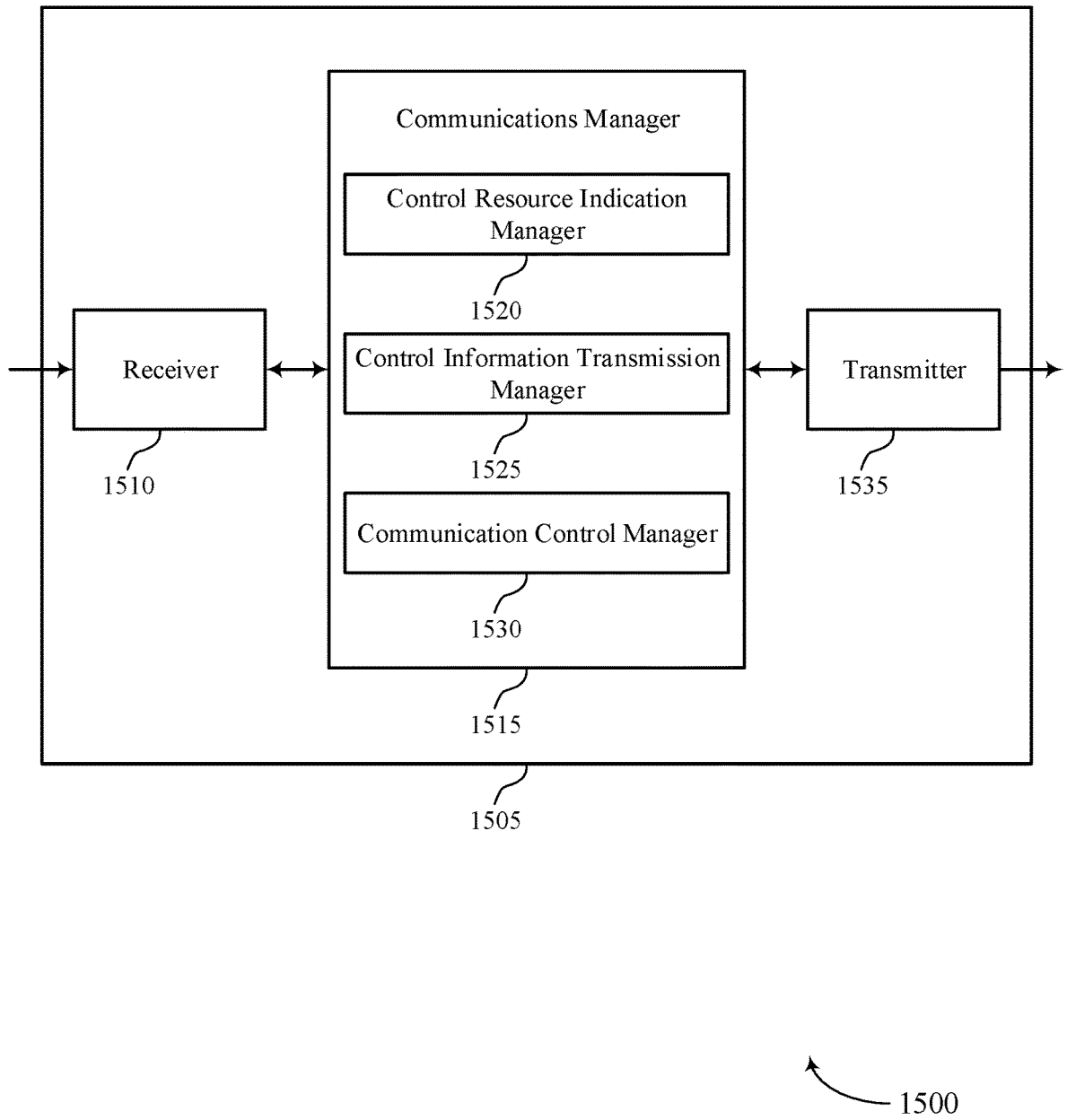

FIG. 15 shows a block diagram 1500 of a device 1505 that supports control resource set design for bandwidth reduced low-tier UE in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to control resource set design for bandwidth reduced low-tier UE, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a control resource indication manager 1520, a control information transmission manager 1525, and a communication control manager 1530. The communications manager 1515 may be an example of aspects of the communications manager 1710 described herein.

The control resource indication manager 1520 may map a set of CCEs across more than three symbols, with the set of CCEs including one or more first REGs mapped to a first monitoring occasion and one or more second REGs mapped to a second monitoring occasion and transmit a signal identifying a control resource set for a UE to monitor for control information scheduling communications between the UE and the base station, the control resource set including the set of CCEs.

The control information transmission manager 1525 may transmit, during the first monitoring occasion, at least a first portion of the control information on the one or more first REGs and transmit, during the second monitoring occasion, at least a second portion of the control information on the one or more second REGs.

The communication control manager 1530 may communicate with the UE in accordance with the control information.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
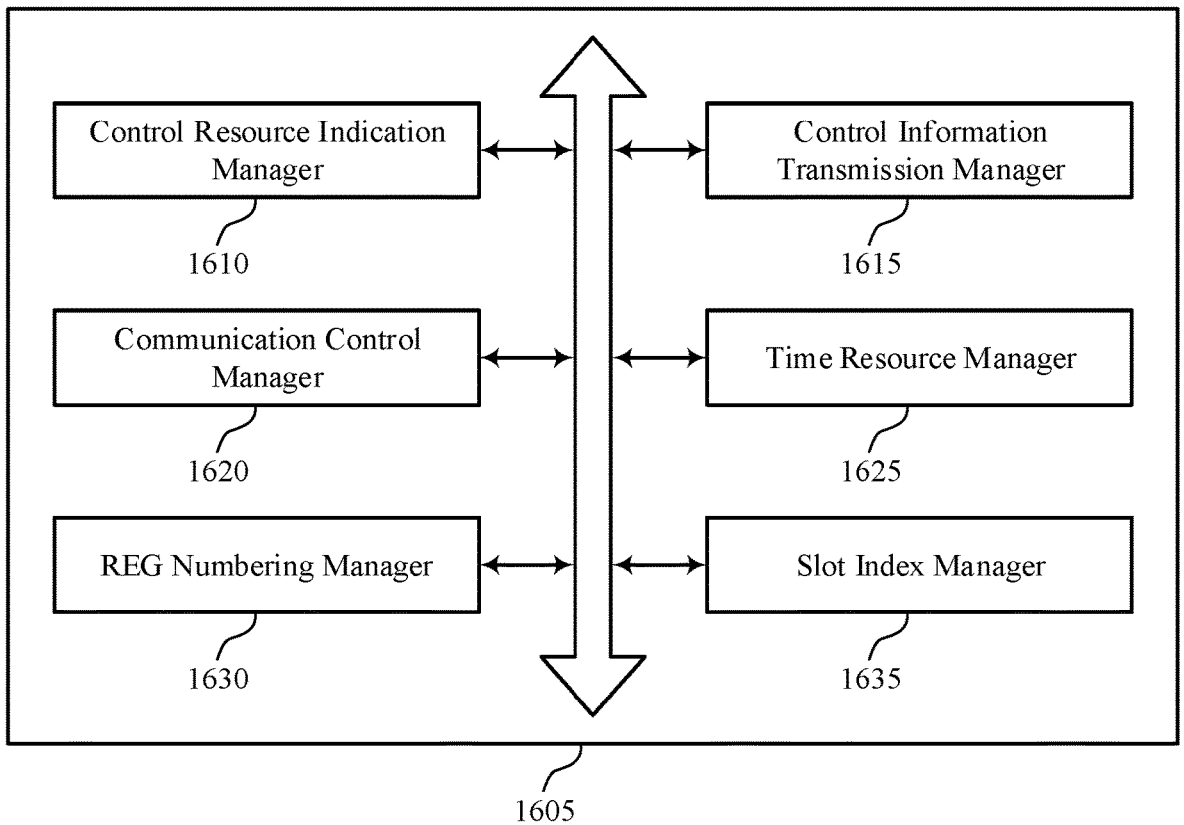
FIG. 16 shows a block diagram of a communications manager that supports control resource set design for bandwidth reduced low-tier UE in accordance with aspects of the present disclosure.

FIG. 16 shows a block diagram 1600 of a communications manager 1605 that supports control resource set design for bandwidth reduced low-tier UE in accordance with aspects of the present disclosure. The communications manager 1605 may be an example of aspects of a communications manager 1415, a communications manager 1515, or a communications manager 1710 described herein. The communications manager 1605 may include a control resource indication manager 1610, a control information transmission manager 1615, a communication control manager 1620, a time resource manager 1625, a REG numbering manager 1630, and a slot index manager 1635. Each of these modules may communicate, directly or indirectly, with one another (e.g., via one or more buses).

The control resource indication manager 1610 may map a set of CCEs across more than three symbols, with the set of CCEs including one or more first REGs mapped to a first monitoring occasion and one or more second REGs mapped to a second monitoring occasion. In some examples, the control resource indication manager 1610 may transmit a signal identifying a control resource set for a UE to monitor for control information scheduling communications between the UE and the base station, the control resource set including the set of CCEs.

The control information transmission manager 1615 may transmit, during the first monitoring occasion, at least a first portion of the control information on the one or more first REGs. In some examples, the control information transmission manager 1615 may transmit, during the second monitoring occasion, at least a second portion of the control information on the one or more second REGs. In some examples, the control information transmission manager 1615 may transmit, during the slot, the control information over the more than three symbols of the slot. In some cases, the first monitoring occasion and the second monitoring occasion include either the same slots or different slots. In some cases, the first monitoring occasion is in a different slot than the second monitoring occasion the control information transmission manager 1615 may identify a timing for the communications with the base station based on a slot index of the first monitoring occasion and an indication of the control information.

The communication control manager 1620 may communicate with the UE in accordance with the control information. In some examples, the communication control manager 1620 may communicate with the UE in accordance with the control information.

The time resource manager 1625 may transmit the first portion of the control information over two or more control portions of the first monitoring occasion. In some examples, the time resource manager 1625 may transmit the second portion of the control information over two or more control portions of the second monitoring occasion. In some examples, the time resource manager 1625 may indicate a timing for the communications with the UE based on a timing of the first monitoring occasion and a duration indication in the control information. In some examples, the time resource manager 1625 may indicate a timing for the communications with the UE based on a timing of the second monitoring occasion. In some cases, the one or more first REGs comprise a first CCE and the one or more second REGs comprise a second CCE, wherein the first CCE is different from the second CCE.

The REG numbering manager 1630 may map the one or more first REGs with a corresponding REG index that is further based on an increasing order of symbol indices of the first monitoring occasion. In some examples, the REG numbering manager 1630 may map the one or more first REGs with a corresponding REG index that is further based on an increasing order of frequency resource block resource indices within the first monitoring occasion.

In some examples, the REG numbering manager 1630 may map the one or more first REGs with a corresponding REG index that is further based on an increasing order of indices of the first monitoring occasion and the second monitoring occasion. In some examples, the REG numbering manager 1630 may map the one or more first REGs with a corresponding interleaver pattern that is further based on the one or more first REGs within the first monitoring occasion. In some examples, the REG numbering manager 1630 may interleave the one or more first REGs of the first monitoring occasion separately from the one or more second REGs of the second monitoring occasion. In some examples, the REG numbering manager 1630 may apply a cyclic shift to the interleaved one or more first REGs of the first monitoring occasion and one or more second REGs of the second monitoring occasion, where the cyclic shift is based on at least one of a first identifier for the one or more first REGs, or a second identifier for the one or more second REGs, or a slot index for the first monitoring occasion, or a second index for the second monitoring occasion, or a combination thereof.

The slot index manager 1635 may identify a slot index of the first monitoring occasion. In some examples, the slot index manager 1635 may identify the first CCE index of the set of CCEs in the control resource set based on the slot index.

Figure 17:
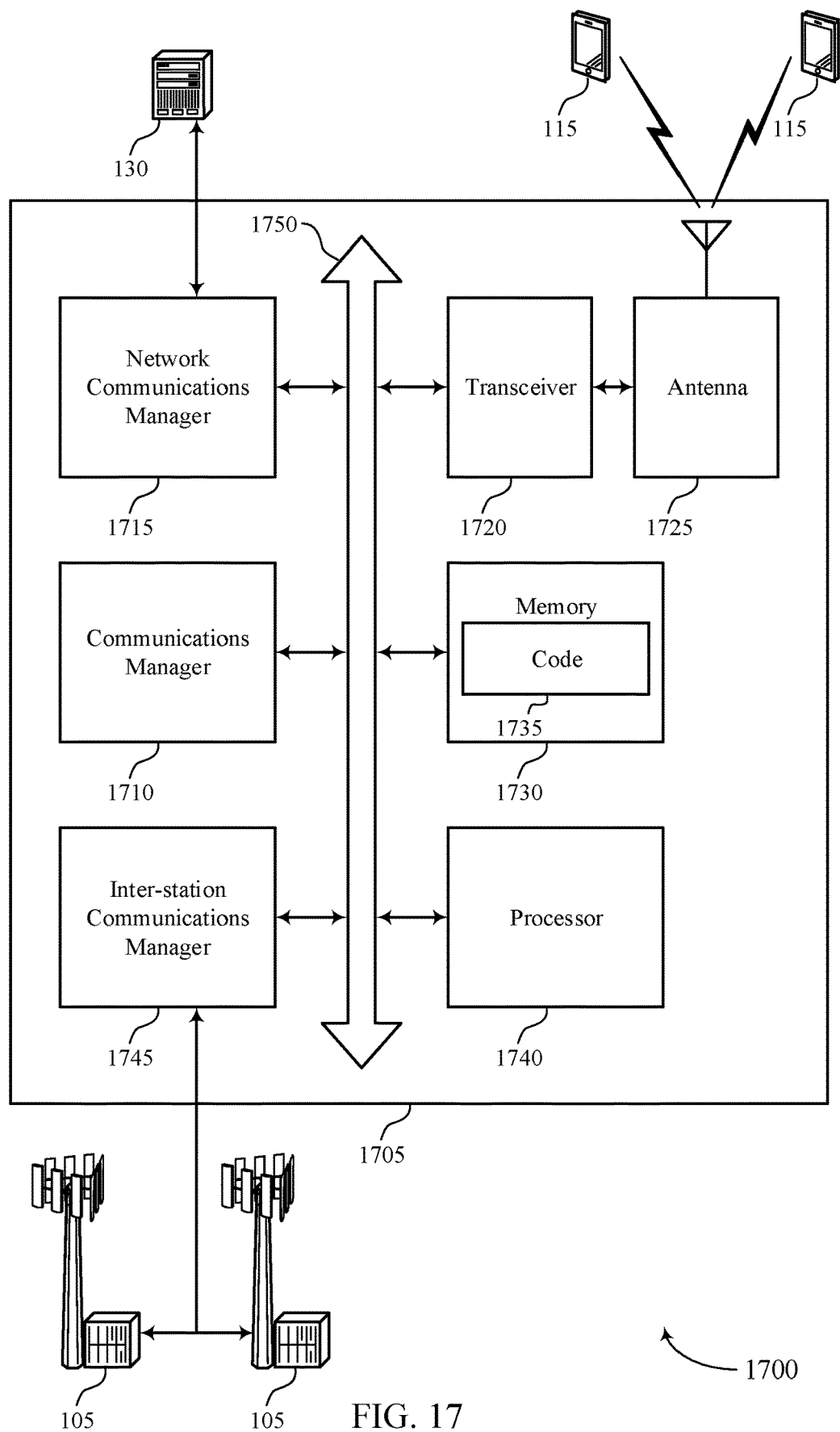
FIG. 17 shows a diagram of a system including a device that supports control resource set design for bandwidth reduced low-tier UE in accordance with aspects of the present disclosure.

FIG. 17 shows a diagram of a system 1700 including a device 1705 that supports control resource set design for bandwidth reduced low-tier UE in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may map a set of CCEs across more than three symbols, with the set of CCEs including one or more first REGs mapped to a first monitoring occasion and one or more second REGs mapped to a second monitoring occasion, transmit a signal identifying a control resource set for a UE to monitor for control information scheduling communications between the UE and the base station, the control resource set including the set of CCEs, transmit, during the first monitoring occasion, at least a first portion of the control information on the one or more first REGs, transmit, during the second monitoring occasion, at least a second portion of the control information on the one or more second REGs, and communicate with the UE in accordance with the control information.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting control resource set design for bandwidth reduced low-tier UE).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
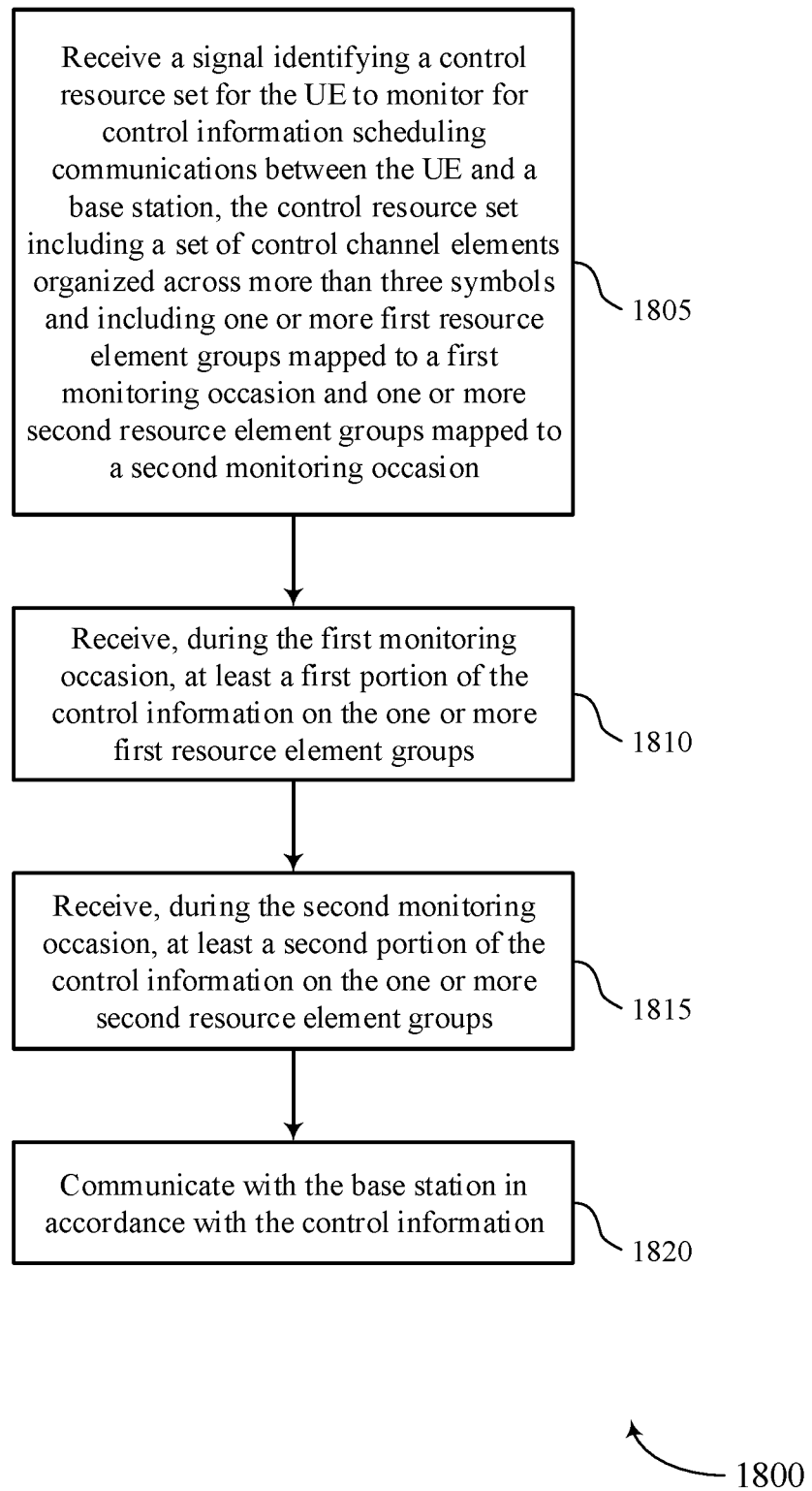
FIGS. 18 through 21 show flowcharts illustrating methods that support control resource set design for bandwidth reduced low-tier UE in accordance with aspects of the present disclosure.

FIG. 18 shows a flowchart illustrating a method 1800 that supports control resource set design for bandwidth reduced low-tier UE in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive a signal identifying a control resource set for the UE to monitor for control information scheduling communications between the UE and a base station, the control resource set including a set of CCEs organized across more than three symbols and including one or more first REGs mapped to a first monitoring occasion and one or more second REGs mapped to a second monitoring occasion. The operations of 1805 may be performed according to the methods described herein. In some examples, aspects of the operations of 1805 may be performed by a control resource indication manager as described with reference to FIGS. 10 through 13.

At 1810, the UE may receive, during the first monitoring occasion, at least a first portion of the control information on the one or more first REGs. The operations of 1810 may be performed according to the methods described herein. In some examples, aspects of the operations of 1810 may be performed by a control information receipt manager as described with reference to FIGS. 10 through 13.

At 1815, the UE may receive, during the second monitoring occasion, at least a second portion of the control information on the one or more second REGs. The operations of 1815 may be performed according to the methods described herein. In some examples, aspects of the operations of 1815 may be performed by a control information receipt manager as described with reference to FIGS. 10 through 13.

At 1820, the UE may communicate with the base station in accordance with the control information. The operations of 1820 may be performed according to the methods described herein. In some examples, aspects of the operations of 1820 may be performed by a communication control manager as described with reference to FIGS. 10 through 13.

Figure 19:
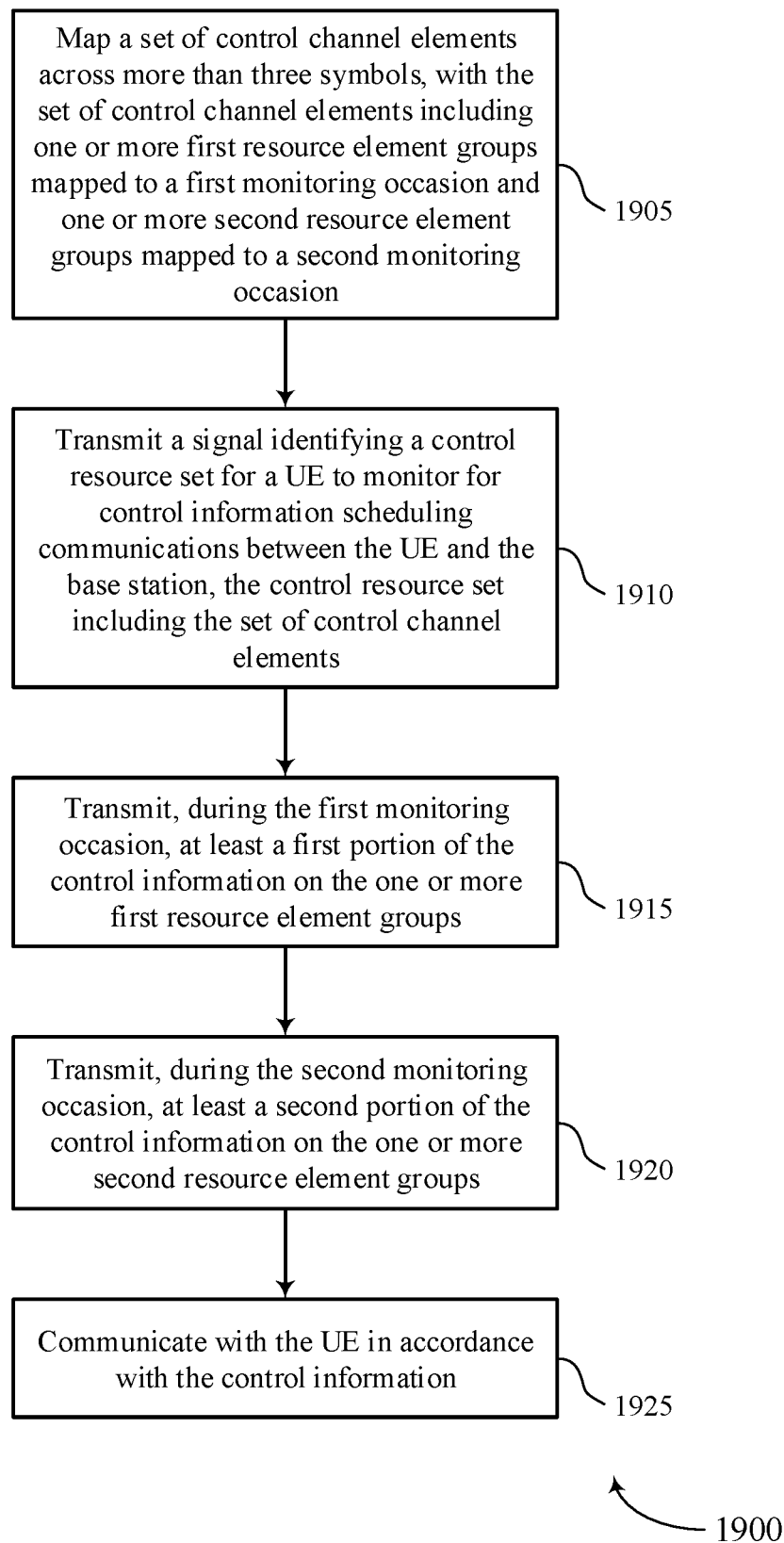

FIG. 19 shows a flowchart illustrating a method 1900 that supports control resource set design for bandwidth reduced low-tier UE in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 1905, the base station may map a set of CCEs across more than three symbols, with the set of CCEs including one or more first REGs mapped to a first monitoring occasion and one or more second REGs mapped to a second monitoring occasion. The operations of 1905 may be performed according to the methods described herein. In some examples, aspects of the operations of 1905 may be performed by a control resource indication manager as described with reference to FIGS. 14 through 17.

At 1910, the base station may transmit a signal identifying a control resource set for a UE to monitor for control information scheduling communications between the UE and the base station, the control resource set including the set of CCEs. The operations of 1910 may be performed according to the methods described herein. In some examples, aspects of the operations of 1910 may be performed by a control resource indication manager as described with reference to FIGS. 14 through 17.

At 1915, the base station may transmit, during the first monitoring occasion, at least a first portion of the control information on the one or more first REGs. The operations of 1915 may be performed according to the methods described herein. In some examples, aspects of the operations of 1915 may be performed by a control information transmission manager as described with reference to FIGS. 14 through 17.

At 1920, the base station may transmit, during the second monitoring occasion, at least a second portion of the control information on the one or more second REGs. The operations of 1920 may be performed according to the methods described herein. In some examples, aspects of the operations of 1920 may be performed by a control information transmission manager as described with reference to FIGS. 14 through 17.

At 1925, the base station may communicate with the UE in accordance with the control information. The operations of 1925 may be performed according to the methods described herein. In some examples, aspects of the operations of 1925 may be performed by a communication control manager as described with reference to FIGS. 14 through 17.

Figure 20:
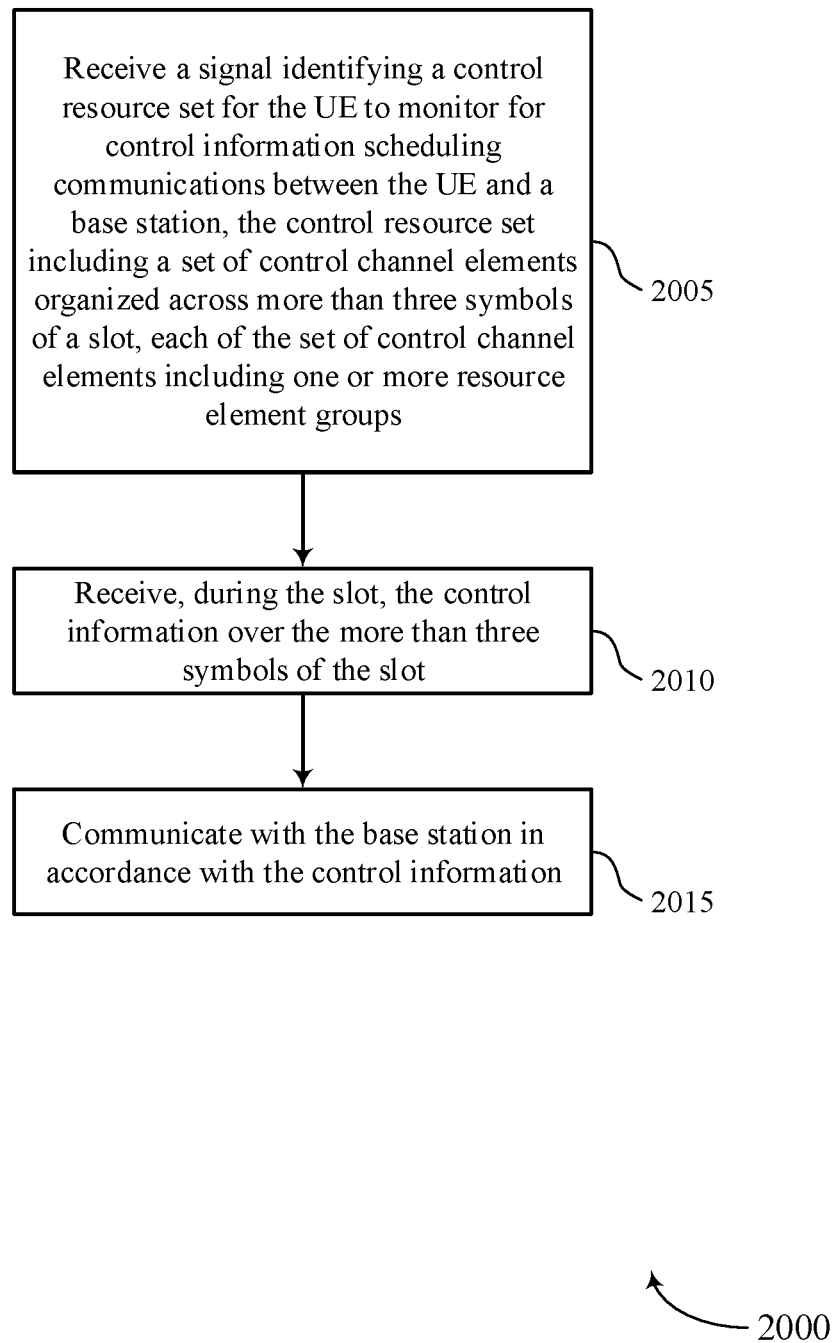

FIG. 20 shows a flowchart illustrating a method 2000 that supports control resource set design for bandwidth reduced low-tier UE in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive a signal identifying a control resource set for the UE to monitor for control information scheduling communications between the UE and a base station, the control resource set including a set of CCEs organized across more than three symbols of a slot, each of the set of CCEs including one or more REGs. The operations of 2005 may be performed according to the methods described herein. In some examples, aspects of the operations of 2005 may be performed by a control resource indication manager as described with reference to FIGS. 10 through 13.

At 2010, the UE may receive, during the slot, the control information over the more than three symbols of the slot. The operations of 2010 may be performed according to the methods described herein. In some examples, aspects of the operations of 2010 may be performed by a control information receipt manager as described with reference to FIGS. 10 through 13.

At 2015, the UE may communicate with the base station in accordance with the control information. The operations of 2015 may be performed according to the methods described herein. In some examples, aspects of the operations of 2015 may be performed by a communication control manager as described with reference to FIGS. 10 through 13.

Figure 21:
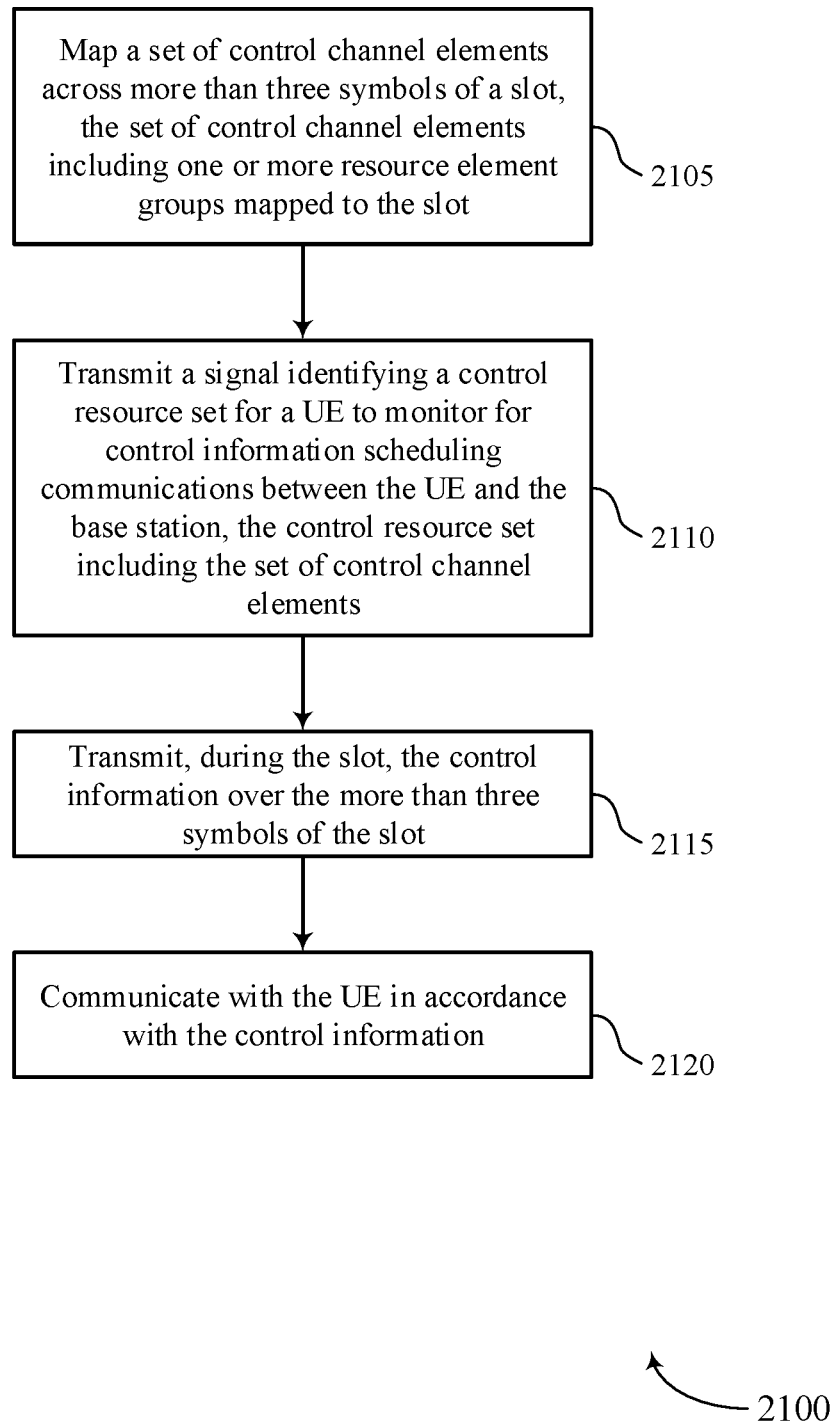

FIG. 21 shows a flowchart illustrating a method 2100 that supports control resource set design for bandwidth reduced low-tier UE in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may map a set of CCEs across more than three symbols of a slot, the set of CCEs including one or more REGs mapped to the slot. The operations of 2105 may be performed according to the methods described herein. In some examples, aspects of the operations of 2105 may be performed by a control resource indication manager as described with reference to FIGS. 14 through 17.

At 2110, the base station may transmit a signal identifying a control resource set for a UE to monitor for control information scheduling communications between the UE and the base station, the control resource set including the set of CCEs. The operations of 2110 may be performed according to the methods described herein. In some examples, aspects of the operations of 2110 may be performed by a control resource indication manager as described with reference to FIGS. 14 through 17.

At 2115, the base station may transmit, during the slot, the control information over the more than three symbols of the slot. The operations of 2115 may be performed according to the methods described herein. In some examples, aspects of the operations of 2115 may be performed by a control information transmission manager as described with reference to FIGS. 14 through 17.

At 2120, the base station may communicate with the UE in accordance with the control information. The operations of 2120 may be performed according to the methods described herein. In some examples, aspects of the operations of 2120 may be performed by a communication control manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a signal identifying a control resource set for the UE to monitor for control information scheduling communications between the UE and a base station, the control resource set comprising a plurality of control channel elements organized across more than three symbols and comprising one or more first resource element groups mapped to a first monitoring occasion and one or more second resource element groups mapped to a second monitoring occasion;
   receiving, during the first monitoring occasion, at least a first portion of the control information on the one or more first resource element groups;
   receiving, during the second monitoring occasion, at least a second portion of the control information on the one or more second resource element groups; and
   communicating with the base station in accordance with the control information.

2. The method of claim 1, wherein the one or more first resource element groups comprise a first control channel element and the one or more second resource element groups comprise a second control channel element, wherein the first control channel element is different from the second control channel element.

3. The method of claim 1, wherein receiving at least the first portion of the control information on the one or more first resource element groups during the first monitoring occasion comprises:
   identifying the one or more first resource element groups based at least in part on a corresponding resource element group index that is based at least in part on an increasing order of symbol indices the first monitoring occasion.

4. The method of claim 3, wherein receiving at least the first portion of the control information on the one or more first resource element groups during the first monitoring occasion further comprises:
   identifying the one or more first resource element groups based at least in part on the corresponding resource element group index that is further based at least in part on an increasing order of frequency resource block resource indices within the first monitoring occasion.

5. The method of claim 4, wherein receiving at least the first portion of the control information on the one or more first resource element groups during the first monitoring occasion further comprises:
   identifying the one or more first resource element groups based at least in part on the corresponding resource element group index that is further based at least in part on an increasing order of indices of the first monitoring occasion and the second monitoring occasion.

6. The method of claim 3, wherein receiving at least the first portion of the control information on the one or more first resource element groups during the first monitoring occasion further comprises:
   identifying the one or more first resource element groups based at least in part on an interleaver pattern that is further based at least in part on the one or more first resource element groups within the first monitoring occasion.

7. The method of claim 6, further comprising:
   deinterleaving the one or more first resource element groups of the first monitoring occasion separately from the second one or more resource element groups of the second monitoring occasion.

8. The method of claim 7, wherein deinterleaving the one or more first resource element groups of the first monitoring occasion and the one or more second resource element groups of the second monitoring occasion comprises:
   identifying a cyclic shift applied to the interleaved one or more first resource element groups of the first monitoring occasion and one or more second resource element groups of the second monitoring occasion, wherein the cyclic shift is based on at least one of a first identifier for the one or more first resource element groups, or a second identifier for the one or more second resource element groups, or a first slot index for the first monitoring occasion, or a second slot index for the second monitoring occasion, or a combination thereof.

9. The method of claim 1, further comprising:
   identifying a slot index of the first monitoring occasion; and
   identifying the first control channel element index of the set of control channel elements in the control resource set based at least in part on the slot index.

10. The method of claim 1, wherein the first monitoring occasion is a same or a different slot than the second monitoring occasion.

11. The method of claim 1, wherein the first monitoring occasion is in a different slot than the second monitoring occasion, further comprising:
    identifying a timing for the communications with the base station based on a slot index of the first monitoring occasion and an indication of the control information.

12. A method for wireless communication at a base station, comprising:
    mapping a plurality of control channel elements across more than three symbols, with the plurality of control channel elements comprising one or more first resource element groups mapped to a first monitoring occasion and one or more second resource element groups mapped to a second monitoring occasion;

transmitting a signal identifying a control resource set for a user equipment (UE) to monitor for control information scheduling communications between the UE and the base station, the control resource set comprising the plurality of control channel elements;

transmitting, during the first monitoring occasion, at least a first portion of the control information on the one or more first resource element groups;

transmitting, during the second monitoring occasion, at least a second portion of the control information on the one or more second resource element groups; and communicating with the UE in accordance with the control information.

13. The method of claim 12, further comprising:
transmitting the first portion of the control information over two or more control portions of the first monitoring occasion; and
transmitting the second portion of the control information over two or more control portions of the second monitoring occasion.

14. The method of claim 12, wherein transmitting at least the first portion of the control information on the one or more first resource element groups during the first monitoring occasion comprises:
mapping the one or more first resource element groups with a corresponding resource element group index that is further based at least in part on an increasing order of symbol indices of the first monitoring occasion.

15. The method of claim 14, wherein transmitting at least the first portion of the control information on the one or more first resource element groups during the first monitoring occasion comprises:
mapping the one or more first resource element groups with a corresponding resource element group index that is further based at least in part on an increasing order of frequency resource block resource indices within the first monitoring occasion.

16. The method of claim 15, wherein transmitting at least the first portion of the control information on the one or more first resource element groups during the first monitoring occasion comprises:
mapping the one or more first resource element groups with a corresponding resource element group index that is further based at least in part on an increasing order of indices of the first monitoring occasion and the second monitoring occasion.

17. The method of claim 16, wherein transmitting at least the first portion of the control information on the one or more first resource element groups during the first monitoring occasion further comprises:
mapping the one or more first resource element groups with a corresponding interleaver pattern that is further based at least in part on the one or more first resource element groups within the first monitoring occasion.

18. The method of claim 12, further comprising:
interleaving the one or more first resource element groups of the first monitoring occasion separately from the one or more second resource element groups of the second monitoring occasion.

19. The method of claim 18, wherein interleaving the one or more first resource element groups of the first monitoring occasion and the one or more second resource element groups of the second monitoring occasion comprises:
applying a cyclic shift to the interleaved one or more first resource element groups of the first monitoring occasion and one or more second resource element groups of the second monitoring occasion, wherein the cyclic shift is based on at least one of a first identifier for the one or more first resource element groups, or a second identifier for the one or more second resource element groups, or a first slot index for the first monitoring occasion, or a second slot index for the second monitoring occasion, or a combination thereof.

20. The method of claim 12, further comprising:
identifying a slot index of the first monitoring occasion; and
identifying the first control channel element index of the set of control channel elements in the control resource set based at least in part on the slot index.

21. The method of claim 12, wherein the one or more first resource element groups comprise a first control channel element and the one or more second resource element groups comprise a second control channel element, wherein the first control channel element is different from the second control channel element.

22. The method of claim 12, wherein the first monitoring occasion is a same or a different slot than the second monitoring occasion.

23. The method of claim 12, wherein the first monitoring occasion is in a different slot than the second monitoring occasion, further comprising
scheduling a timing for the communications with the UE based at least in part on a slot index of the first monitoring occasion and an indication of the control information.

24. An apparatus for wireless communication at a user equipment (UE), comprising:
a processor,
memory coupled with the processor; and
instructions stored in the memory and executable by the processor to cause the apparatus to:
receive a signal identifying a control resource set for the UE to monitor for control information scheduling communications between the UE and a base station, the control resource set comprising a plurality of control channel elements organized across more than three symbols and comprising one or more first resource element groups mapped to a first monitoring occasion and one or more second resource element groups mapped to a second monitoring occasion;
receive, during the first monitoring occasion, at least a first portion of the control information on the one or more first resource element groups;
receive, during the second monitoring occasion, at least a second portion of the control information on the one or more second resource element groups; and
communicate with the base station in accordance with the control information.

25. The apparatus of claim 24, wherein the one or more first resource element groups comprise a first control channel element and the one or more second resource element groups comprise a second control channel element, wherein the first control channel element is different from the second control channel element.

26. The apparatus of claim 24, wherein the instructions to receive at least the first portion of the control information on the one or more first resource element groups during the first monitoring occasion are executable by the processor to cause the apparatus to:

identify the one or more first resource element groups based at least in part on a corresponding resource element group index that is based at least in part on an increasing order of symbol indices of the first monitoring occasion.

27. The apparatus of claim 26, wherein the instructions to receive at least the first portion of the control information on the one or more first resource element groups during the first monitoring occasion further are executable by the processor to cause the apparatus to:
identify the one or more first resource element groups based at least in part on the corresponding resource element group index that is further based at least in part on an increasing order of frequency resource block resource indices within the first monitoring occasion.

28. An apparatus for wireless communication at a base station, comprising:
a processor;
memory coupled with the processor; and
instructions stored in the memory and executable by the processor to cause the apparatus to:
map a plurality of control channel elements across more than three symbols, with the plurality of control channel elements comprising one or more first resource element groups mapped to a first monitoring occasion and one or more second resource element groups mapped to a second monitoring occasion;
transmit a signal identifying a control resource set for a user equipment (UE) to monitor for control information scheduling communications between the UE and the base station, the control resource set comprising the plurality of control channel elements;
transmit, during the first monitoring occasion, at least a first portion of the control information on the one or more first resource element groups;
transmit, during the second monitoring occasion, at least a second portion of the control information on the one or more second resource element groups; and
communicate with the UE in accordance with the control information.

29. The apparatus of claim 28, wherein the instructions are further executable by the processor to cause the apparatus to:
transmit the first portion of the control information over two or more control portions of the first monitoring occasion; and
transmit the second portion of the control information over two or more control portions of the second monitoring occasion.

30. The apparatus of claim 28, wherein the instructions to transmit at least the first portion of the control information on the one or more first resource element groups during the first monitoring occasion are executable by the processor to cause the apparatus to:
map the one or more first resource element groups with a corresponding resource element group index that is further based at least in part on an increasing order of symbol indices of the first monitoring occasion.

\* \* \* \* \*